(12) United States Patent
Iwasaki et al.

(10) Patent No.: US 6,601,938 B1
(45) Date of Patent: Aug. 5, 2003

(54) INK-JET PRINT METHOD AND APPARATUS

(75) Inventors: Osamu Iwasaki, Tokyo (JP); Naoji Otsuka, Yokohama (JP); Kentaro Yano, Yokohama (JP); Kiichiro Takahashi, Kawasaki (JP); Hitoshi Nishikori, Inagi (JP); Daigoro Kanematsu, Yokohama (JP); Hidehiko Kanda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/307,765

(22) Filed: May 10, 1999

Related U.S. Application Data

(62) Division of application No. 08/847,743, filed on Apr. 22, 1997.

(30) Foreign Application Priority Data

Apr. 23, 1996 (JP) ............................................. 8-101713

(51) Int. Cl.[7] .............................. B41J 2/21; B41J 2/205
(52) U.S. Cl. .......................................... 347/15; 347/43
(58) Field of Search ...................................... 347/15, 43

(56) References Cited

U.S. PATENT DOCUMENTS

| 4,313,124 A | 1/1982 | Hara |
| 4,345,262 A | 8/1982 | Shirato et al. |
| 4,459,600 A | 7/1984 | Sato et al. |
| 4,463,359 A | 7/1984 | Ayata et al. |
| 4,516,135 A | 5/1985 | Todoh |
| 4,528,576 A | 7/1985 | Koumura et al. ............. 347/15 |
| 4,558,333 A | 12/1985 | Sugitani et al. |
| 4,560,997 A | 12/1985 | Sato et al. |
| 4,608,577 A | 8/1986 | Hori |
| 4,617,580 A | 10/1986 | Miyakawa |
| 4,635,078 A | 1/1987 | Sakurada et al. |
| 4,723,129 A | 2/1988 | Endo et al. |
| 4,740,796 A | 4/1988 | Endo et al. |
| 4,860,026 A | 8/1989 | Matsumoto et al. .......... 347/15 |
| 4,872,027 A | 10/1989 | Buskirk et al. |
| 5,049,898 A | 9/1991 | Arthur et al. ................. 347/19 |
| 5,097,343 A | 3/1992 | Chiba et al. |
| 5,138,344 A | 8/1992 | Ujita |
| 5,235,351 A | 8/1993 | Koizumi |
| 5,245,362 A | 9/1993 | Iwata et al. |
| 5,394,250 A | 2/1995 | Shono |
| 5,448,274 A | 9/1995 | Hirabayashi et al. |
| 5,579,446 A | 11/1996 | Naik et al. |
| 5,604,520 A | 2/1997 | Matsubara et al. |
| 5,625,384 A | 4/1997 | Numata et al. |
| 5,625,397 A | 4/1997 | Allred et al. |
| 5,714,990 A | 2/1998 | Courtney |
| 5,729,259 A | 3/1998 | Gotoh et al. |
| 5,739,828 A | 4/1998 | Moriyama et al. |
| 5,742,306 A | 4/1998 | Gompertz et al. |
| 5,805,180 A | 9/1998 | Ebisawa et al. |
| 5,818,474 A | 10/1998 | Takahashi et al. |

(List continued on next page.)

FOREIGN PATENT DOCUMENTS

| EP | 0 351 754 | 1/1990 |
| EP | 0 372 826 | 6/1990 |
| EP | 0 401 023 | 12/1990 |

(List continued on next page.)

*Primary Examiner*—Thinh Nguyen
(74) *Attorney, Agent, or Firm*—Fitzpatrick, Cella, Harper & Scinto

(57) ABSTRACT

Print codes supplied from a host computer are received and analyzed to generate print data for the individual colors, and the generated print data are stored in print buffers corresponding to the colors. The print data corresponding to yellow ink with high lightness is expressed by binary data, and is printed by one dot per pixel by a single print scan. The print data corresponding to each of the remaining high-density (thick) inks is expressed by multi-valued data having a larger number of bits than the yellow data, and is printed by a plurality of print scans.

25 Claims, 23 Drawing Sheets

U.S. PATENT DOCUMENTS

| | | |
|---|---|---|
| 5,828,389 A | 10/1998 | Yamaguchi et al. |
| 5,831,646 A | 11/1998 | Kuronuma et al. |
| 5,854,642 A | 12/1998 | Takahashi et al. |
| 5,946,419 A | 8/1999 | Chen et al. |
| 6,027,196 A | 2/2000 | Gotoh et al. .................. 347/43 |
| 6,158,836 A | 12/2000 | Iwasaki et al. |

FOREIGN PATENT DOCUMENTS

| | | |
|---|---|---|
| EP | 0 440 261 | 8/1991 |
| EP | 0 574 199 | 12/1993 |
| EP | 0 585 028 | 3/1994 |
| EP | 0 595 517 | 5/1994 |
| EP | 0 600 735 | 6/1994 |
| EP | 0 627 323 | 12/1994 |
| EP | 0 628 415 | 12/1994 |
| EP | 0 630 752 | 12/1994 |
| EP | 0 642 260 | 3/1995 |
| EP | 0 654 352 | 5/1995 |
| EP | 0 687 565 | 12/1995 |
| EP | 0 688 673 | 12/1995 |
| EP | 0 700 786 | 3/1996 |
| EP | 0 720 916 | 7/1996 |
| EP | 0 741 488 | 11/1996 |
| EP | 0 750 944 | 1/1997 |
| JP | 54-056847 | 5/1979 |
| JP | 59-123670 | 7/1984 |
| JP | 59-138461 | 8/1984 |
| JP | 60-071260 | 4/1985 |
| JP | 60-163571 | 8/1985 |
| JP | 64-11836 | 1/1989 |
| JP | 1-174459 | 7/1989 |
| JP | 2-031562 | 2/1990 |
| JP | 03-005156 | 1/1991 |
| JP | 03-051138 | 3/1991 |
| JP | 4-332652 | 11/1992 |
| JP | 5-96807 | 4/1993 |
| JP | 6-24006 | 2/1994 |
| JP | 06-155758 | 6/1994 |
| JP | 06-199031 | 7/1994 |
| JP | 6-255110 | 9/1994 |
| JP | 6-328733 | 11/1994 |
| JP | 7-052390 | 2/1995 |
| JP | 7-60969 | 3/1995 |
| JP | 7-112531 | 5/1995 |
| JP | 7-144419 | 6/1995 |
| JP | 7-266576 | 10/1995 |
| JP | 8-1962 | 1/1996 |
| JP | 8-39380 | 2/1996 |
| JP | 8-58082 | 3/1996 |
| JP | 8-58115 | 3/1996 |
| JP | 8-80661 | 3/1996 |
| JP | 9-104125 | 4/1997 |

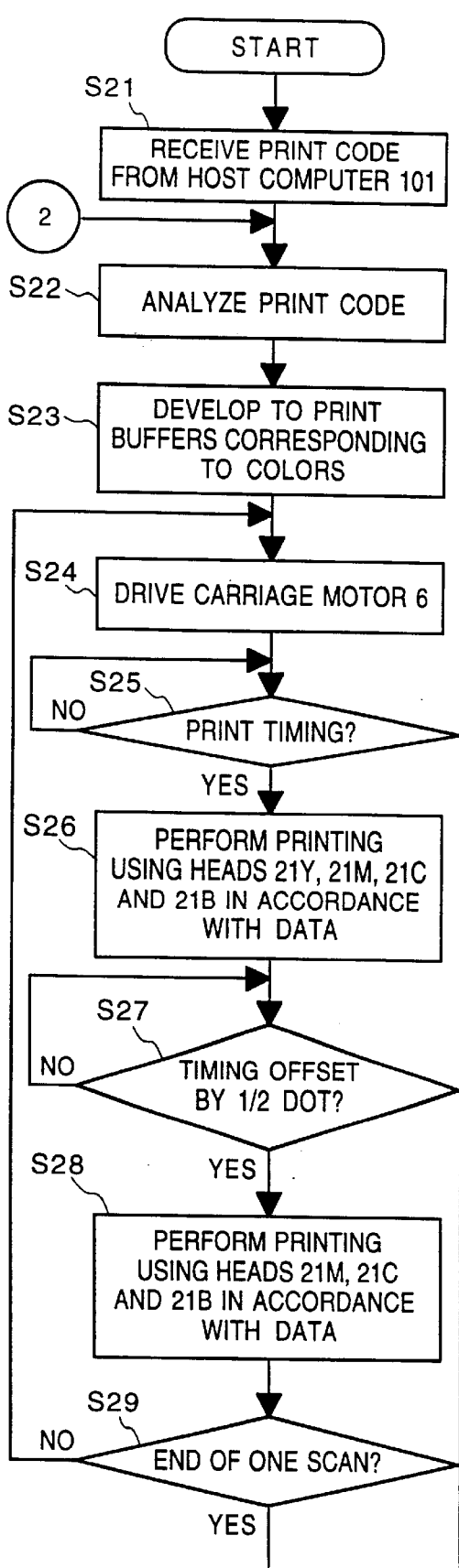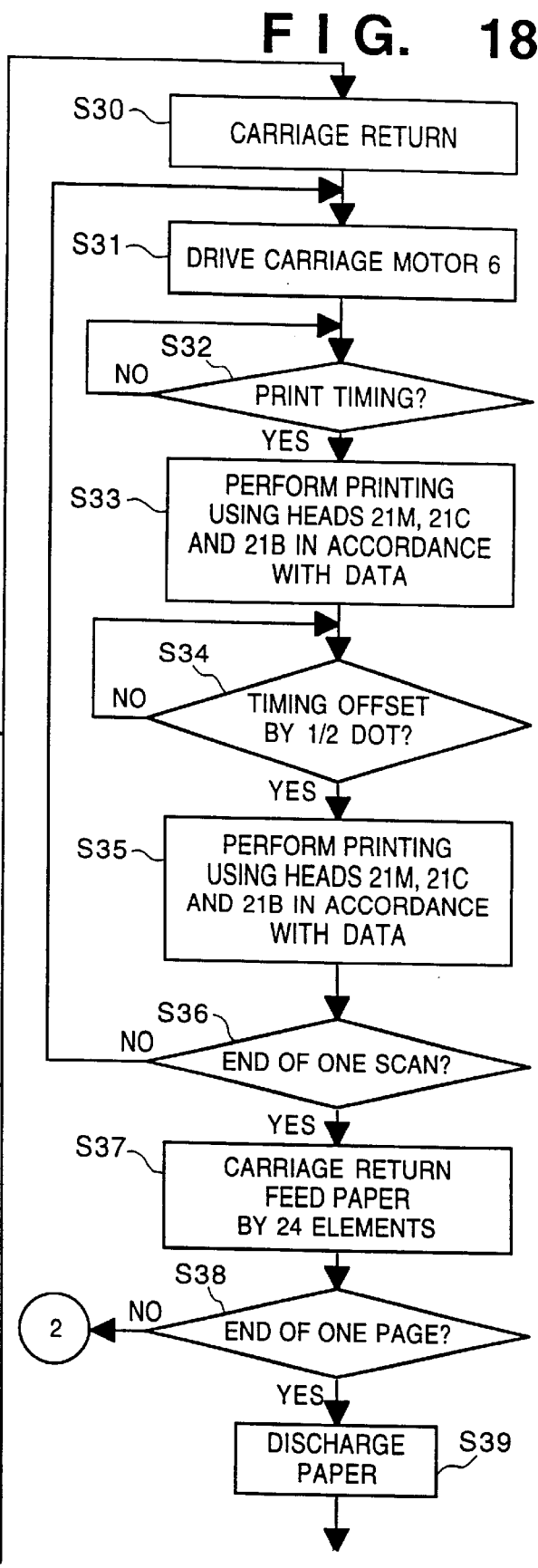
FIG. 18

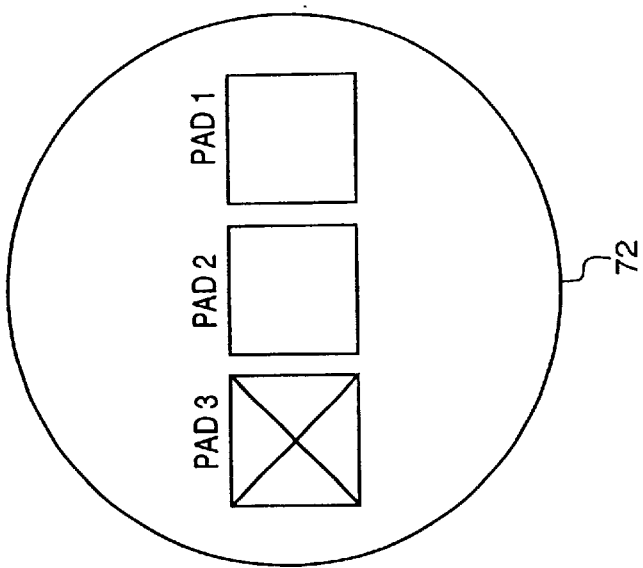
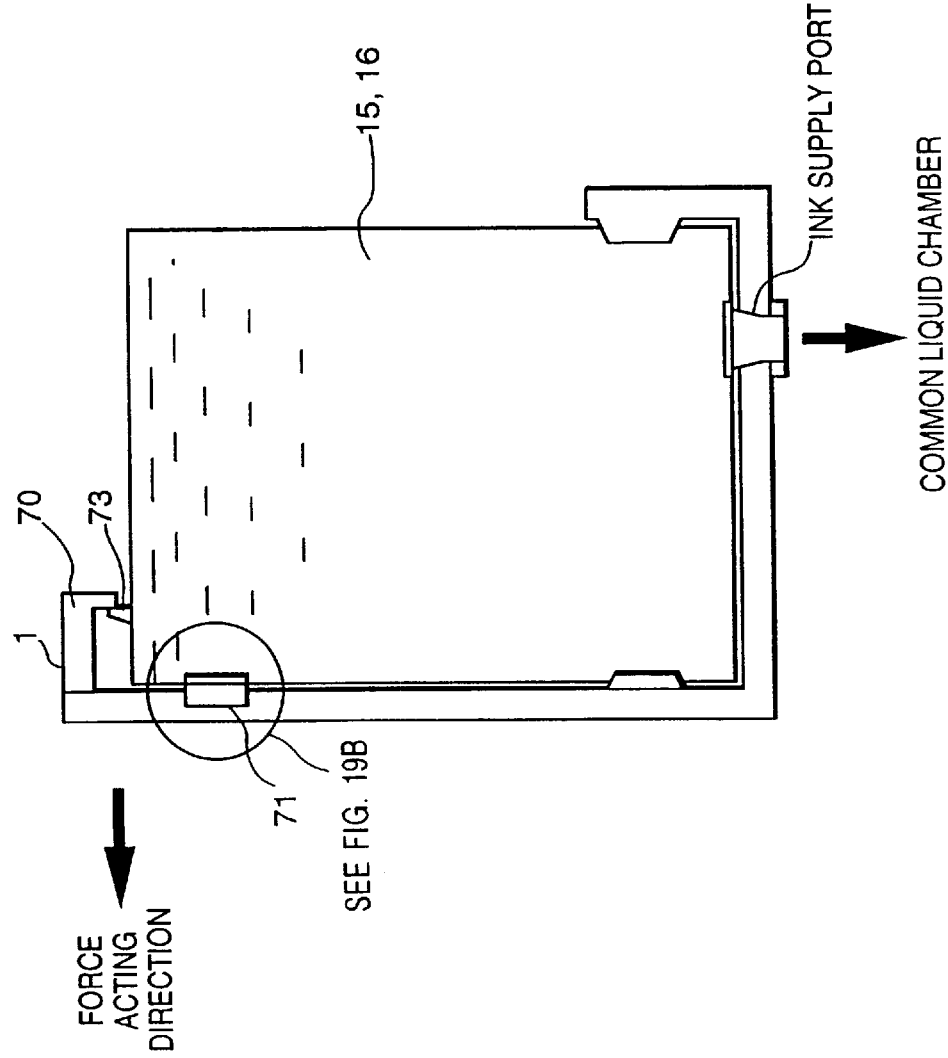

FIG. 22

```
PRINT MODE
         O   NORMAL MODE
         O   PICTORIAL MODE 1
         O   PICTORIAL MODE 2
         O   MONOCHROME MODE
```

FIG. 23

SET PLAIN PAPER, COATED PAPER,
OR PICTORIAL PAPER

FIG. 24

MOUNT HEAD CARTRIDGE FOR PICTORIAL MODE 1

CURRENT HEAD CARTRIDGE | FOR NORMAL MODE

INK-JET PRINT METHOD AND APPARATUS

CROSS-REFERENCE TO RELATED APPLICATIONS

This application is a divisional application of U.S. patent application Ser. No. 08/847,743, filed Apr. 22, 1997, and which is related to U.S. patent applications Ser. No. 08/844,854, U.S. Ser. Nos. 08/847,740, 08/847,744 and U.S. Ser. No. 08/847,984, all filed on Apr. 22, 1997. All the applications are assigned to the assignee of this application and are incorporated herein by reference.

BACKGROUND OF THE INVENTION

The present invention relates to an ink-jet print method and apparatus for printing an image on a printing medium using a printhead having a plurality of print elements (nozzles) that eject ink.

In recent years, color printers using various print schemes have been developed as color image output equipment. Of these printers, serial ink-jet printers that print in units of lines (bands) are popularly used owing to their merits, i.e., since they are inexpensive, can print high-quality images on a large number of kinds of print media, can be easily made compact, and so on.

Such serial printer forms a print image by developing print information for one scan (band) into image data to store the data in a memory, and driving the print elements of a printhead on the basis of the image data developed on the memory while scanning the printhead with respect to a printing medium. Among such serial printer apparatuses, a color printer apparatus that prints a color image using color inks is known, and as its printhead, a head prepared by arranging, in line, yellow, magenta, cyan, and black print element groups (nozzle groups) in a direction perpendicular to the scanning direction of the printhead is popularly used. In the printhead with this arrangement, the print element groups corresponding to the individual colors are arranged to be separated by given intervals to produce a delay time from when the print scan using one color print element group is complete for the printing medium until the print scan of print data of the next color is started. Also, the ratio of decrease in print speed attributed to the delay time is decreased. In this manner, color nonuniformity, smearing, and the like, which are produced between adjacent different color dots on the printing medium, can be eliminated, and a color output with high image quality can be realized.

In recent years, more printer apparatuses perform binarization processing for image data including multi-valued information per pixel like a picture image and output processed data. When such multi-valued data is converted into binary data, the size (dot area) of one pixel printed and its lightness determine the graininess of the image. More specifically, it is generally known that the graininess increases as the area (dot shape) of one pixel printed is larger, and as the lightness of the pixel is lower (its density is higher). As a technique for reducing the graininess in a printed image, the area of each pixel to be printed is reduced to increase the resolution of the printed image.

For example, a printer apparatus, which mounts both a print means that uses ink with a relatively high density and a print means that uses ink with a relatively low density and prints by selectively using the print means, has been proposed. In this printer apparatus, whether to print using one or both the relatively dark (thick) and light (thin) inks is determined in correspondence with the types of images to be printed.

Also, printer apparatuses which can be selectively used as a monochrome printer apparatus and a color printer apparatus by exchanging an ink cartridge that integrates a printer head and an ink tank, as is well known, are popular. Such printer apparatuses have been developed to realize both the enhanced monochrome function that can realize high-speed wordprocessing outputs, which are strongly demanded by users, and the function of outputting color graphics images. Such printer apparatuses detect the type of cartridge mounted currently, and execute, e.g., processing for switching the control for a monochrome cartridge and the control for a color cartridge. In existing printer apparatuses, the ink cartridge is exchanged to exchange color inks and monochrome ink.

In the field of color printing, various examinations have been made to improve the gradation characteristics of color graphics outputs. For example, the resolution for drawing is set to be higher than that in a normal color print mode to improve the drawing performance, or the resolution of the printer apparatus is increased to supply multi-valued data as print data to the printer apparatus and the multi-valued output is generated using subpixels. Such improvements have been conventionally made among such apparatuses, and have been put into practical applications in recent years.

Furthermore, in order to print a pictorial image using an ink-jet printer apparatus, a method of printing an image on a printing medium simultaneously using inks with a plurality of different dye concentrations has been conventionally proposed. That is, four or three inks, i.e., C, M, Y, and K, or C, M, and Y inks are normally used in a conventional printer apparatus, but two different inks having different dye concentrations are used for each of C, M, Y, and K, or C, M, and Y inks to perform printing. According to such print method, the color reproduction range can be remarkably broadened, and the graininess of the image can be greatly eliminated by printing an area with a high lightness (where dots are dispersed on the printing medium) in the image using ink with a low dye concentration. Conversely, a portion with a low lightness and high saturation is printed using ink with a high dye concentration that produces small graininess, thereby obtaining a high-color development image.

However, in the above-mentioned method, since a large number of different inks must be simultaneously set in the printer apparatus, the printer apparatus becomes a very complicated system. Since a general user performs monochrome printing most of the time, it is not efficient to always prepare inks with low dye concentrations, which are not frequently used, in the printer apparatus. Furthermore, since the printhead cannot have a predetermined size or more, its printable area must be reduced or the capacity per ink of the ink tank must be decreased.

In order to increase the resolution of print data in the conventional color printer apparatus, the storage capacity of a memory means (print buffer) for storing image data must also be increased. Normally, the print buffer comprises a RAM (random-access memory). Since the cost of such RAM is roughly determined in proportion to its memory capacity, an increase in storage capacity of the memory raises the cost of the apparatus.

SUMMARY OF THE INVENTION

The present invention has been made in consideration of the above situation and has as its object to provide an ink-jet print method and apparatus, which can suppress an increase in capacity of a memory for storing image data, and print an image with small graininess while printing image data with large graininess at high resolution and printing other data at lower resolution.

It is another object of the present invention to provide an ink-jet print method and apparatus, which can suppress an increase in capacity of a memory for storing color image data, and print a color image with small graininess while printing color image data with large graininess at high resolution and printing other color image data at lower resolution.

It is still another object of the present invention to provide an ink-jet print method and apparatus, which can suppress an increase in capacity of a memory for storing color image data, and print a color image with small graininess while printing color image data with large graininess as multi-valued data and printing other color image data as binary data.

It is still another object of the present invention to provide an ink-jet print method and apparatus that can obtain a printout with small graininess by suppressing an increase in memory capacity of buffers, which correspond to the print width upon printing by scanning a printhead, and store print data corresponding to the individual colors.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIGS. 8A and 8B show examples of the layouts of printed pixels in the first embodiment of the present invention, in which FIG. 8A shows the layout of yellow pixels and FIG. 8B shows the layout of pixels printed in other colors;

FIGS. 17A and 17B show the layouts of pixels printed in the second embodiment of the present invention, in which FIG. 17A shows the pixel layout of pixels printed using yellow ink, and FIG. 17B shows the layout of pixels printed using other color inks;

FIG. 18 is a flow chart showing the processing in an ink-jet printer apparatus of the second embodiment;

FIGS. 19A and 19B are views showing the contact portion of a head cartridge in the ink-jet printer apparatus of the second embodiment;

FIGS. 22 to 24 show display examples on the screen upon manually setting a print mode in the second embodiment.

PREFERRED EMBODIMENTS OF THE PRESENT INVENTION

The preferred embodiments of the present invention will be described in detail below with reference to the accompanying drawings.

In an image printer apparatus of this embodiment, a printer head comprises C print element groups (C is an integer equal to or larger than 2), and print buffers are arranged in correspondence with the print element groups.

Furthermore, in this embodiment, color image information which is expressed by N values (N is an integer equal to or larger than "3") per pixel is converted into n-valued print data per pixel (n is an integer that satisfies n<N). In this embodiment, n-value conversion processing based on error diffusion is adopted, and this method will be described below with reference to the drawings.

Figure 4:
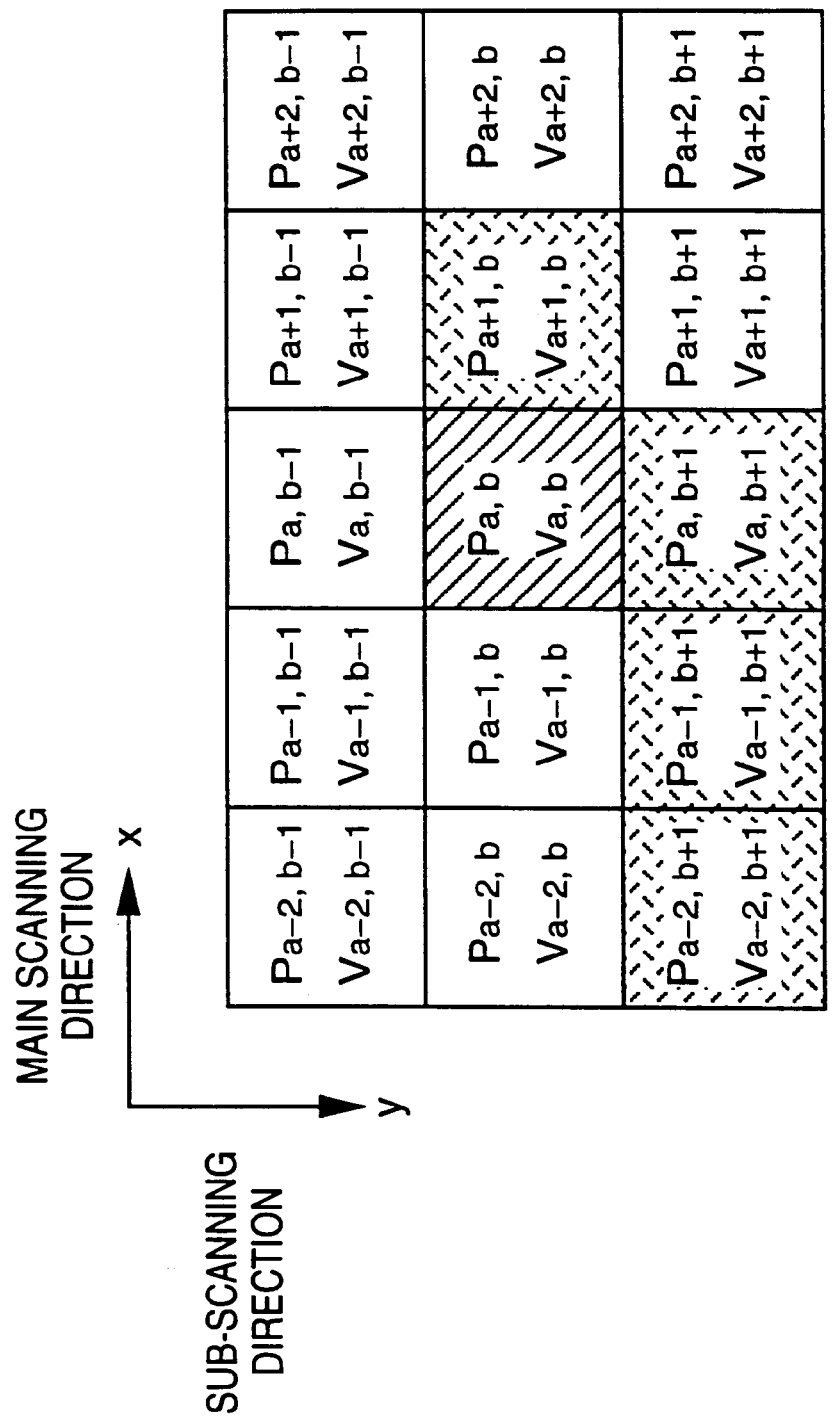
FIG. 4 is a view for explaining the error diffusion method in the first embodiment.

As shown in FIG. 4, a parameter x represents the main-scanning direction in which printing is performed, a parameter y represents the sub-scanning direction, $P_{x,y}$ represents each pixel, and $V_{x,y}$ represents the pixel density of the pixel $P_{x,y}$. Assume that $P_{a,b}$ represents the pixel of interest, and pixels located within the range that satisfies y<b and x<a have already been n-value-converted. In this case, each of (n−1) threshold values for n-value-converting the pixel density $V_{a,b}$ of the pixel $P_{a,b}$ of interest is given by:

$$((2k-1)\times(N-1))/(2\times(n-1))$$

(where k is an integer falling within the range from 1 to (n−1).)

Figure 5:
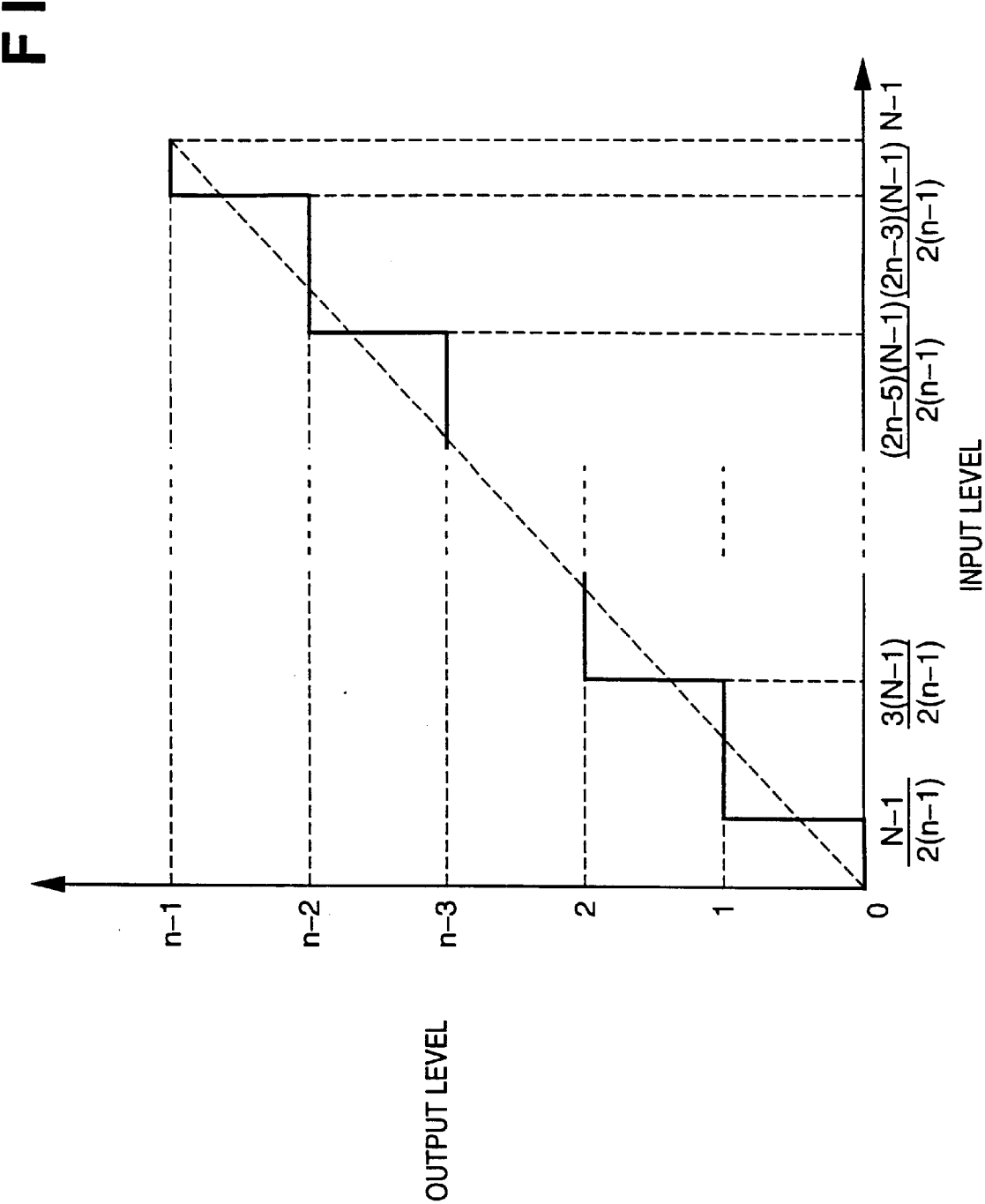
FIG. 5 is a graph for explaining n-valued conversion of N-valued data according to the error diffusion method of the first embodiment.

That is, FIG. 5 is a graph showing the relationship between the N-valued input level and the n-valued output level. In this case, an error E produced between the input level value and the threshold value is described by:

$$E = V_{a,b} - ((2k-1) \times (N-1))/(2 \times (n-1))$$

Subsequently, the error E is distributed to non-n-valued pixels $P_{a+1,b}$, $P_{a-2,b+1}$, $P_{a-1,b+1}$, and $P_{a,b+1}$ around the pixel $P_{a,b}$ of interest. In this case, processing operations based on the following equations are made using weighting coefficients W0, W1, W2, and W3 obtained by experience:

$$V_{a+1,b} = V_{a+1,b} + E \times W0$$

$$V_{a-2,b+1} = V_{a-2,b+1} + E \times W1$$

$$V_{a-1,b+1} = V_{a-1,b+1} + E \times W2$$

$$V_{a,b+1} = V_{a,b+1} + E \times W3$$

For example, these weighting coefficients is respectively assume: W0=7/16, W1=1/16, W2=5/16, and W3=3/16. Such n-value conversion processing is preferably executed by a host computer (101 in FIG. 1 or 601 in FIG. 6) as an image processing apparatus.

Figure 6:
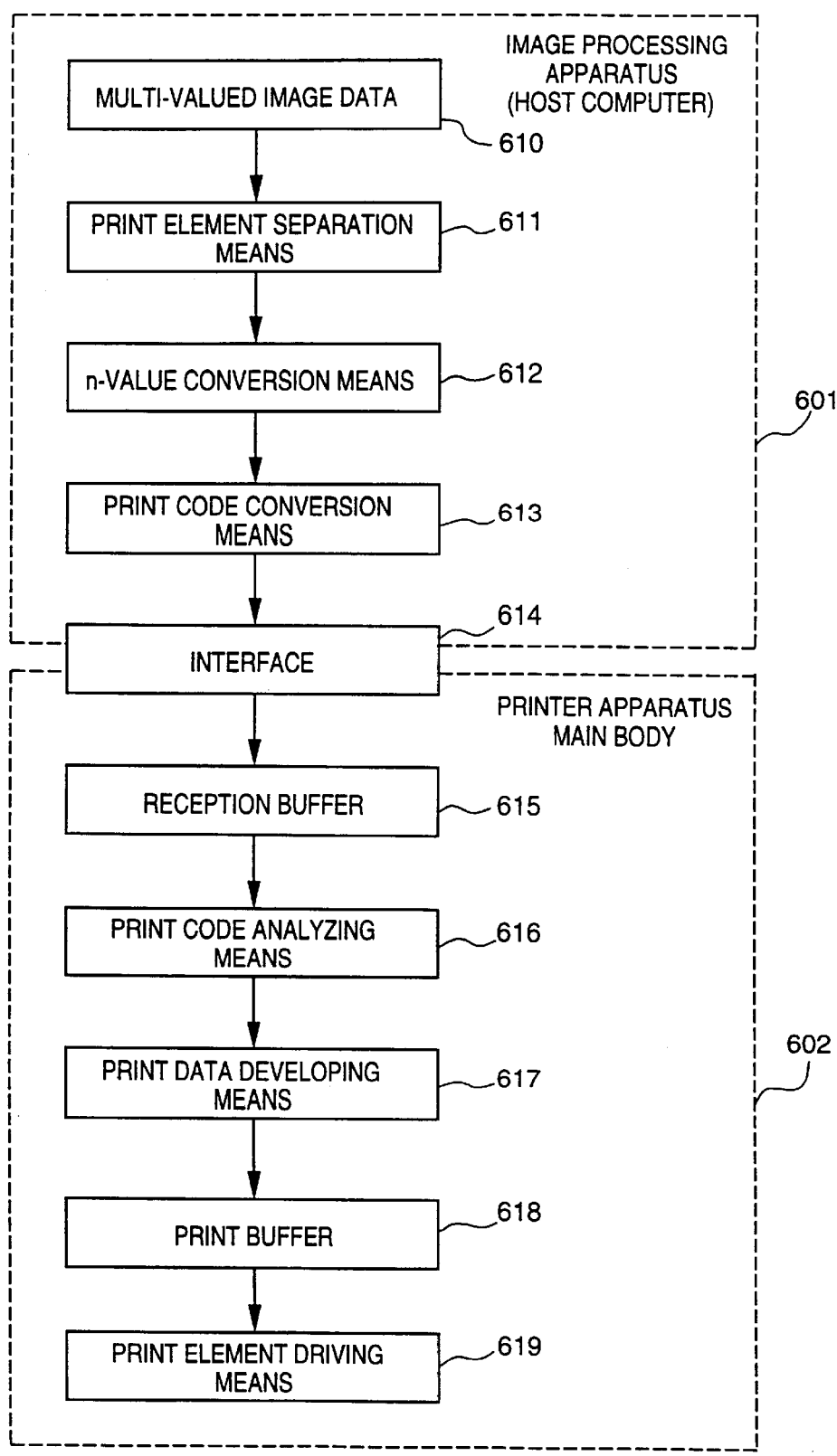
FIG. 6 is a functional block diagram showing the outline of the data processing of the first embodiment.

FIG. 6 shows the flow of image information in an image print system including such host computer 601 and a printer apparatus 602.

Referring to FIG. 6, a range 601 indicates processing in the host computer. In this processing, multi-valued image data 610 is separated into multi-valued data in units of colors by a printer element separation means 611. Then, the multi-valued data are subjected to n-value conversion in units of print elements of the individual colors using an n-value conversion means 612, i.e., converted into n-valued image information per pixel in units of print element groups. The n-valued image information is converted by a print code conversion means 613 into print codes in the form of commands that can be recognized by the printer apparatus 602. The coded print information is transmitted to the printer apparatus 602 via an interface 614.

The printer apparatus 602 receives the print information transmitted via the interface 614, and stores it in a reception buffer 615. Then, print codes stored in the reception buffer 615 are analyzed using a print code analyzing means 616. Image data is developed to images by a print data developing means 617 based on the analyzed data, and these images are developed on print buffers 618 in units of print data of the individual colors. Subsequently, using a print element driving means 619, print elements corresponding to the print data of the individual colors are driven on the basis of the image data corresponding to the individual colors stored in the print buffers 618, thereby forming a color image on a printing medium.

The detailed embodiments of the present invention will be described hereinafter.

First Embodiment

Prior to a detailed description of this embodiment, the mechanical arrangement of a color ink-jet printer apparatus of this embodiment will be described below with reference to FIGS. 2 and 3.

Figure 2:
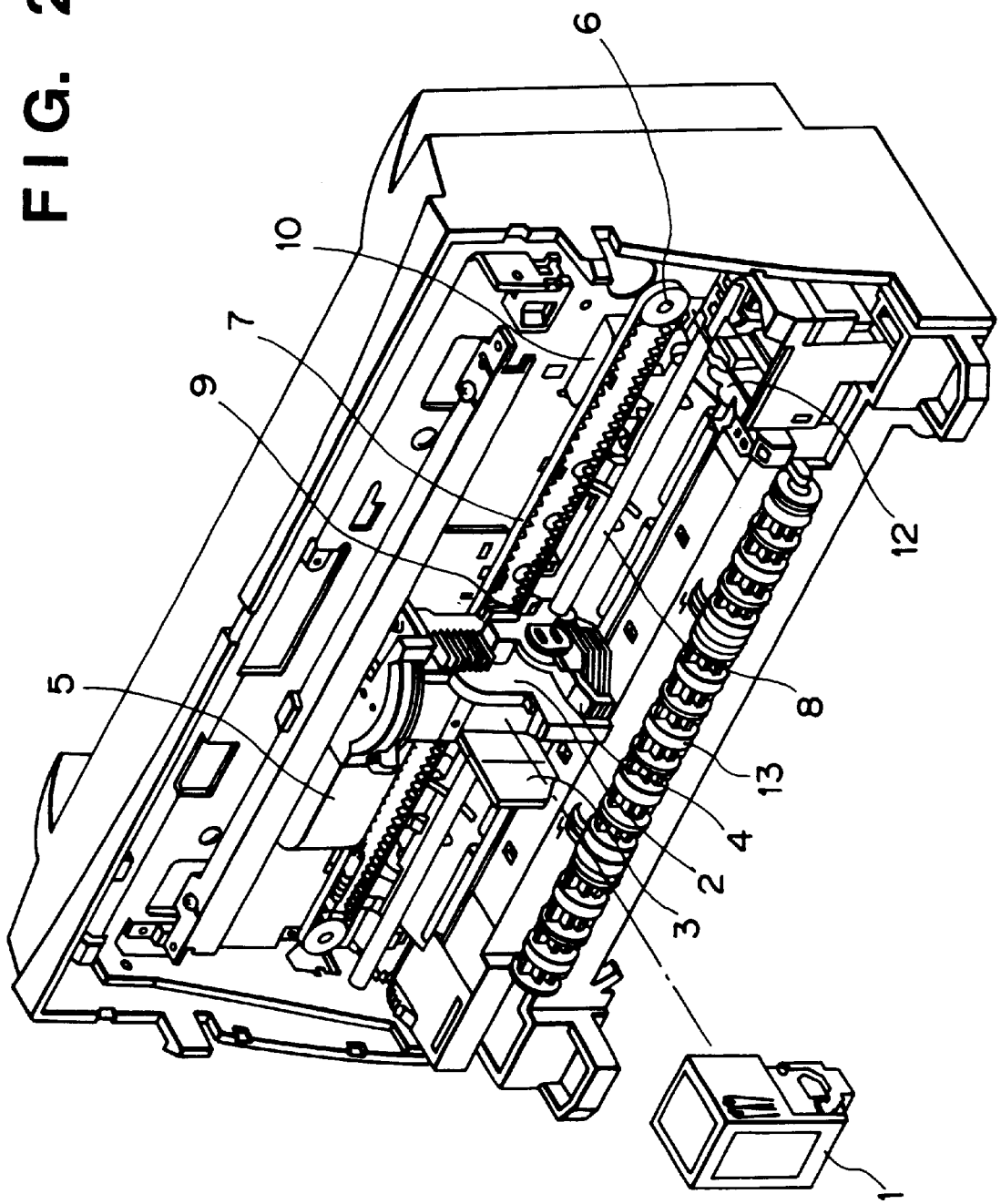
FIG. 2 is a perspective view showing the-mechanical arrangement of a print unit in an ink-jet printer apparatus of the first embodiment.

FIG. 2 is a perspective view showing the arrangement of a cartridge exchangeable type serial color ink-jet printer apparatus according to the first embodiment of the present invention, and illustrates a state wherein the front cover of the color ink-jet printer apparatus is detached to expose the interior of the apparatus.

Referring to FIG. 2, reference numeral 1 denotes a head cartridge which has an ink tank, a printhead, and the like, and is free to attach/detach to/from a carriage unit 2. The carriage unit 2 is reciprocally moved in the main scanning direction in printing while mounting the head cartridge 1 thereon. The head cartridge 1 is fixed to the carriage unit 2 by a holder 3. The holder 3 moves in cooperation with a cartridge fixing lever 4. When the cartridge fixing lever 4 is moved after the head cartridge 1 is set in the carriage unit 2, the head cartridge 1 is press-fitted in the carriage unit 2. With this operation, positioning of the head cartridge 1 in the carriage unit 2 and electrical contacts between the cartridge 1 and the carriage unit 2 can be obtained.

Reference numeral 5 denotes a flexible cable which transmits electrical signals from a control circuit and the like to the carriage unit 2. Reference numeral 6 denotes a carriage motor which reciprocally moves the carriage unit 2 in the main scanning direction by its rotation. Reference numeral 7 denotes a carriage belt which is moved upon rotation of the carriage motor 6, and can convey the carriage unit 2 along a guide shaft 8. Reference numeral 9 denotes a home position sensor which comprises a photocoupler and the like for determining the home position of the carriage unit 2. Reference numeral 10 denotes a light-shield plate. When the light-shield plate 10 shields light coming from the home position sensor 9 of the carriage unit 2, it is detected that the carriage unit 2 is located at the home position. Reference numeral 12 denotes a home position unit which includes recovery functions (ink suction, head cleaning unit, and the like) of the printhead. Reference numeral 13 denotes a paper discharge roller for discharging a printing medium such as a recording paper sheet. The paper discharge roller 13 clamps a printed print paper sheet between itself and a spur unit (not shown) and discharges the printing medium outside the printer apparatus.

Figure 3:
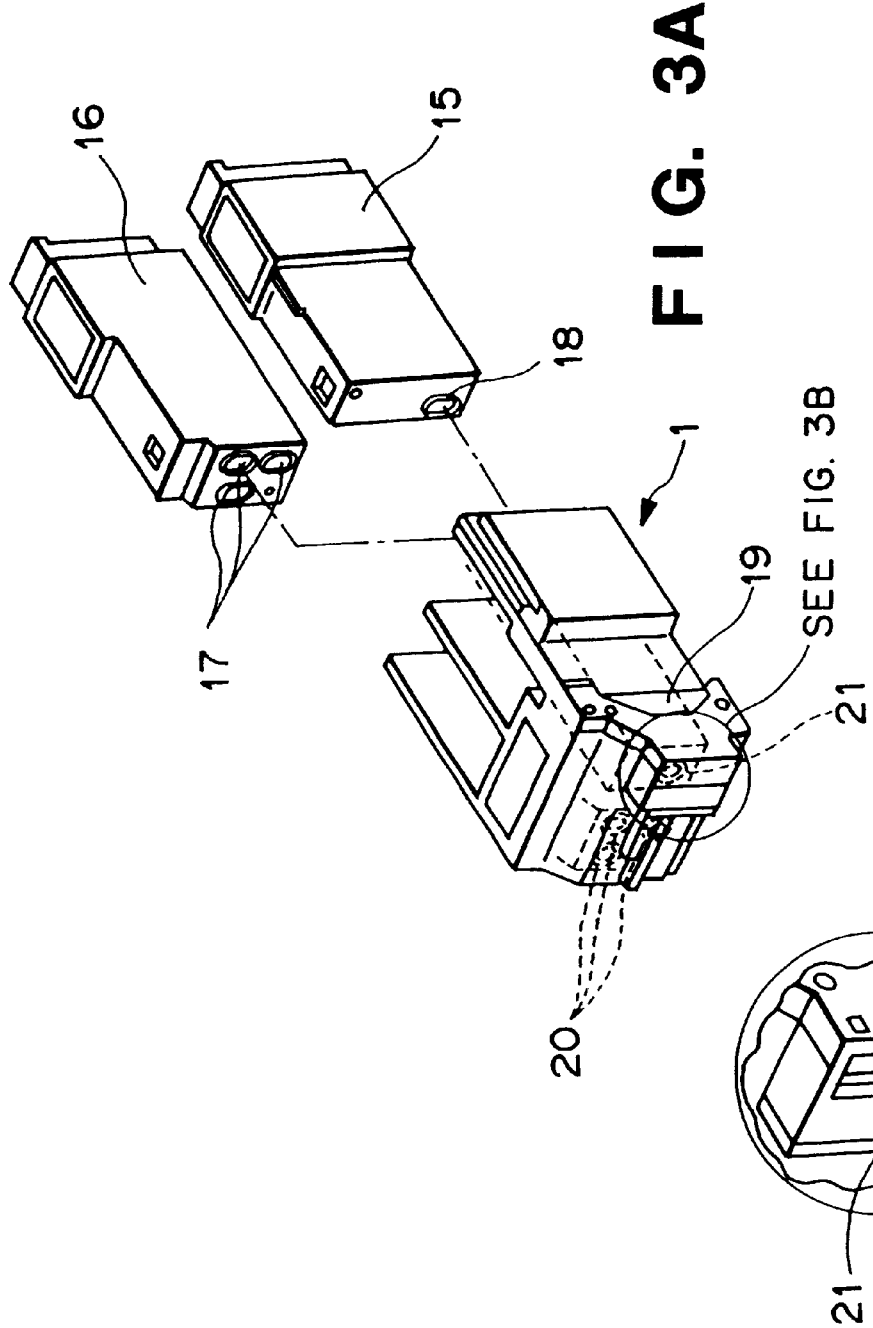
FIGS. 3A and 3B are a perspective views showing the arrangement of a printhead of the ink-jet printer apparatus of the first embodiment.

FIG. 3 shows in detail the head cartridge 1 used in this embodiment.

Reference numeral 15 denotes an exchangeable ink tank that contains black ink. Reference numeral 16 denotes an exchangeable ink tank that contains cyan, magenta, and yellow inks. Reference numeral 17 denotes coupling ports (supply ports) between the ink tank 16 and the head cartridge 1, which ports are coupled to supply tubes 20 of the head cartridge 1 to supply inks into the cartridge 1. Reference numeral 18 denotes an ink supply port of the black ink tank 15. When the tanks are mounted, these ink supply ports 17 and 18 are coupled to the supply tubes 20 so as to supply inks to a printhead unit 21. Reference numeral 19 denotes a contact portion for electrical signals, which is connected to the flexible cable 5 to supply signals from a control unit (201 in FIG. 12) to the printhead unit 21.

Figure 7:
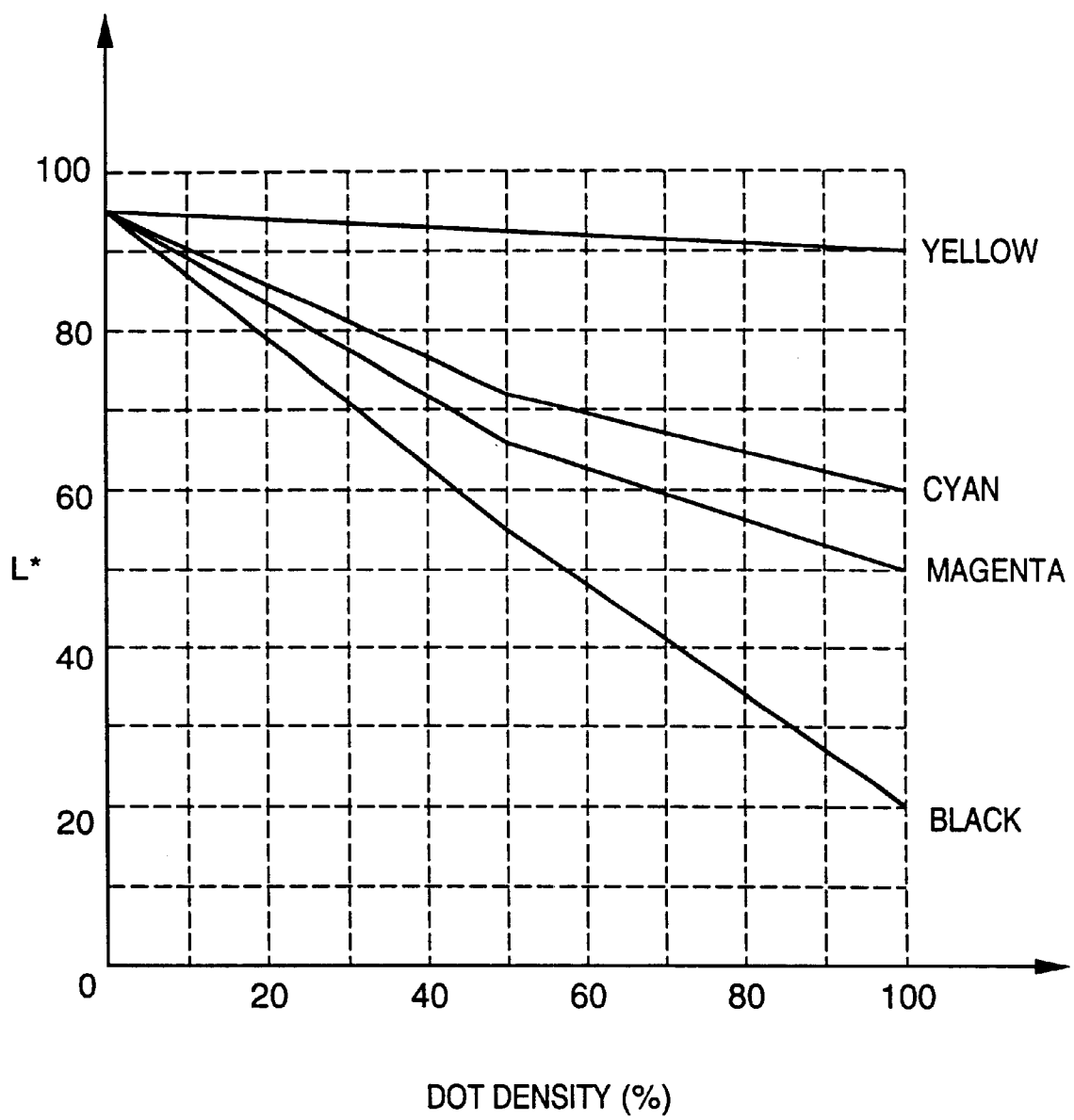
FIG. 7 is a graph showing the relationship between the pixel density and the lightness of printed pixels.

In this embodiment, the printhead unit 21 comprises, as nozzle groups, yellow, magenta, cyan, and black nozzle groups, and prints on, e.g., a coated paper sheet using these nozzle groups of the individual colors. The printed result is measured by a 2-degree visual field using a D65 light source. FIG. 7 shows the relationship between the obtained pixel density and L* (lightness) of the CIE1976 (L*a*b*) color space.

In general, when the pixel density remains the same, the printed result has larger graininess as the lightness is lower (as the density is higher). More specifically, the lightness of a yellow printed image is considerably higher than that of a magenta or cyan printed image. For this reason, the graininess of the yellow printed image appears to be smaller than that of the magenta or cyan printed image. Even when pixels are printed at identical pixel densities (thickness), the lightness of a black printed image is considerably lower than that of a yellow printed image. For this reason, the black printed image appears to have larger graininess than that of the yellow printed image.

Figure 8A:
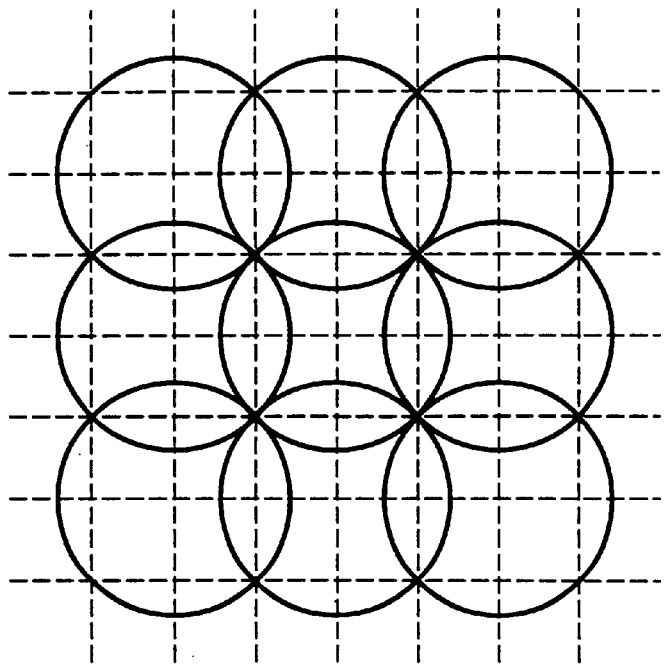
Figure 8B:
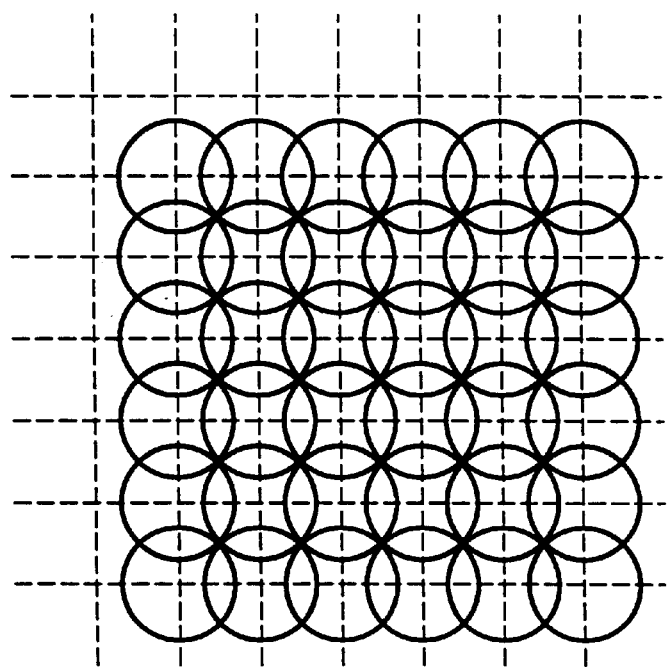

In consideration of these facts, in the first embodiment, the resolutions of images printed in magenta, cyan, and black with low lightness are set to be higher than that of an image printed in yellow. More specifically, the dot shapes of images printed in colors with low lightness are set to be smaller than that of an image printed in a color with high lightness. For example, the resolution of magenta, cyan, and black image data is doubled in the vertical and horizontal directions with respect to that of yellow image data. In this manner, the dot size of an image printed in magenta, cyan, and black is set to be ¼ (25%) of that of an image printed in yellow on a printing medium. FIGS. 8A and 8B show the relationship of such print density.

FIG. 8A shows the shape of pixels printed in yellow, and FIG. 8B shows the shape of pixels printed in other colors.

Figure 1:
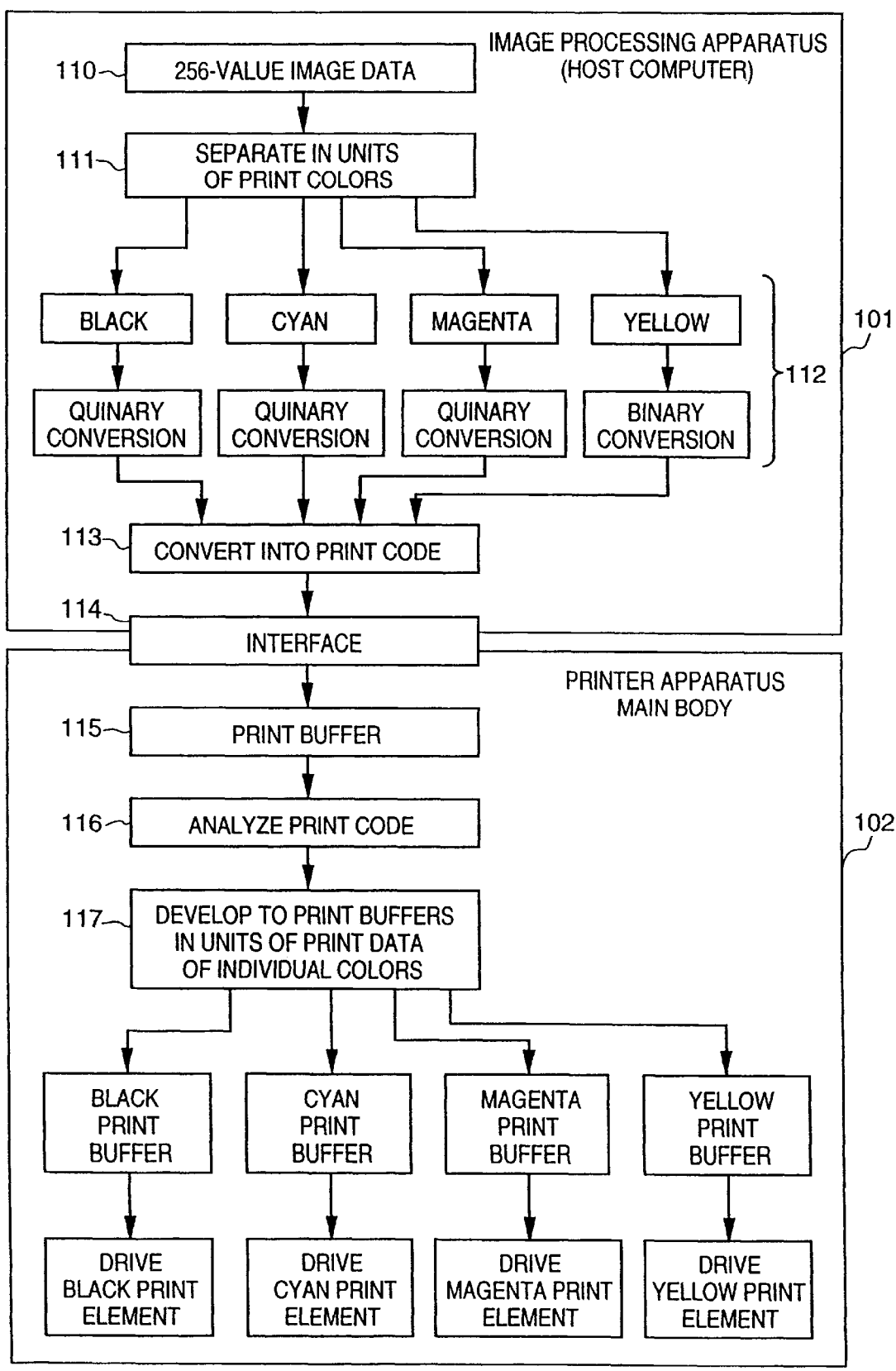
FIG. 1 is a functional block diagram showing the functional arrangement of a print system according to the first embodiment of the present invention as the flow of data.

The printed image processing method in the color image print system of the first embodiment will be described below with reference to FIG. 1. Note that FIG. 1 shows in more detail the arrangement shown in FIG. 6 above. Note that a printer apparatus 102 corresponds to the ink-jet printer apparatus described above with reference to FIGS. 2 and 3.

In the first embodiment, original print data 110 is multi-valued data expressed by 8 bits (256 values) per pixel with respect to print data of the individual colors. A host computer 101 separates the 256-valued image data 110 in units of print colors (111). In this case, the print data of the individual colors are converted into 256-valued image data having the same resolution as that of yellow data. Subsequently, an n-value conversion processing means 112 performs binary conversion processing for image data of yellow components, and performs quinary conversion processing for image data of the remaining magenta, cyan, and black components. The binary image data of the yellow components and the quinary image data of the magenta, cyan, and black components are converted into print codes in units of identical scan lines (rasters) or in units of scan lines for identical print widths (bands) (113), and the converted print codes are transmitted to the printer apparatus 102 via an interface 114.

The binary image data (yellow data) is expressed by "0" or "1" in binary notation as 1-bit data. On the other hand, the quinary image data can assume one of "0000", "0001", "0011", "0111", and "1111" in binary notation as 4-bit data.

The printer apparatus 102 stores the data received from the host computer 101 in a reception buffer 115. Then, the printer apparatus 102 analyzes print codes (116) and stores them in print buffers corresponding to the individual colors in units of color print data. More specifically, the binary image data of yellow components is developed on a yellow print buffer, and the quinary image data of the magenta, cyan, and black components are developed on corresponding print buffers. The print elements of the printhead unit 21 are driven to print on the basis of the print data corresponding to the colors. In this case, the quinary data is developed to binary data extending over two scan lines, and are printed.

FIGS. 9A and 9B, and FIGS. 10A to 10E show the relationship between these print data and the print buffers (print positions).

Figure 9A:
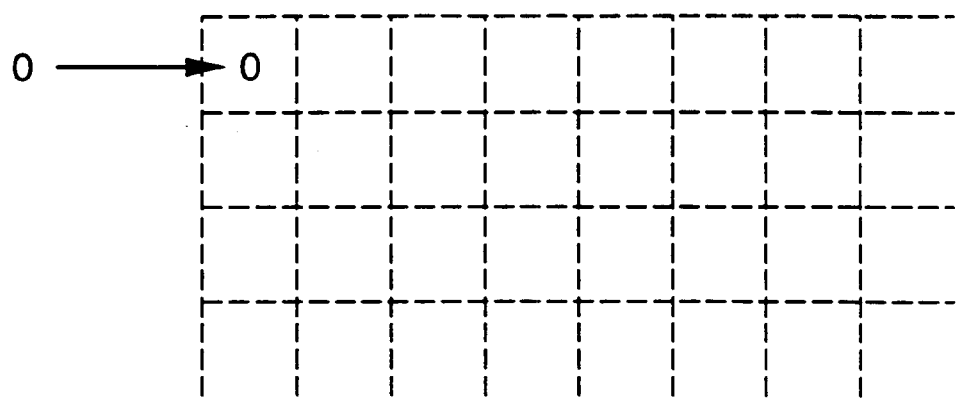
FIGS. 9A and 9B are views for explaining development of yellow data onto a print buffer in the first embodiment of the present invention.
Figure 9B:
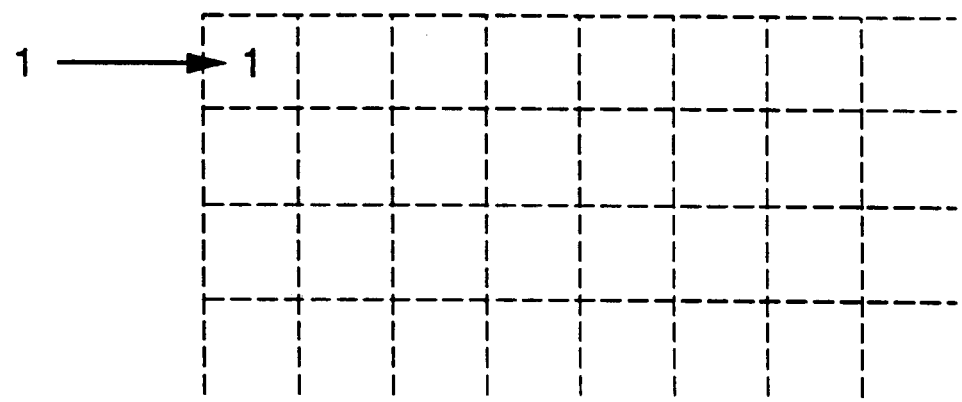
Figure 10A:
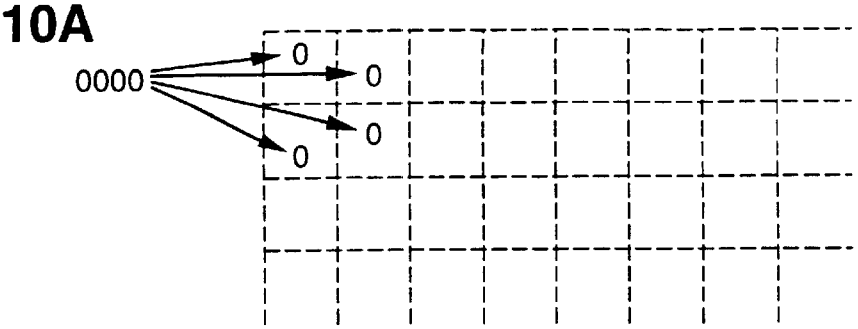
FIGS. 10A to 10E are views for explaining development of black, cyan, and magenta data onto print buffers in the first embodiment of the present invention.
Figure 10B:
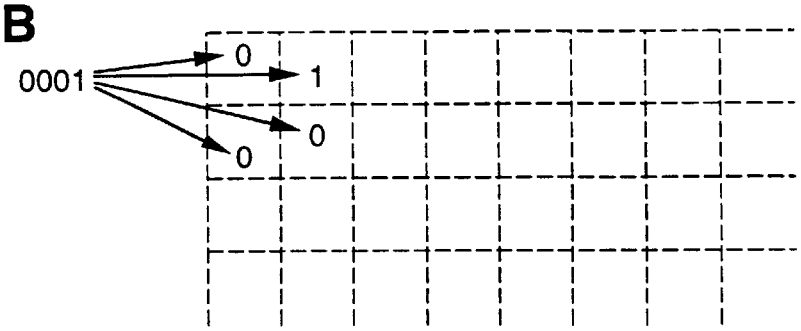
Figure 10C:
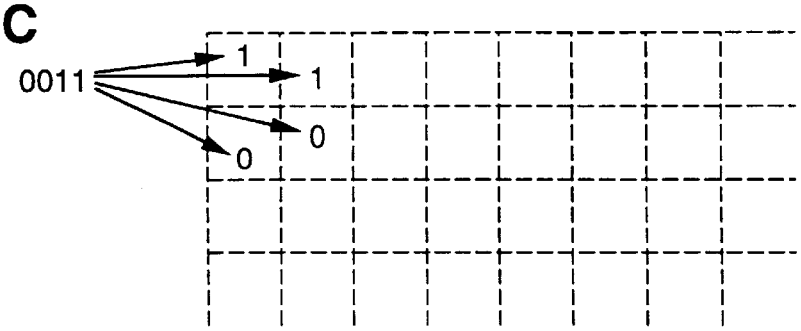
Figure 10D:
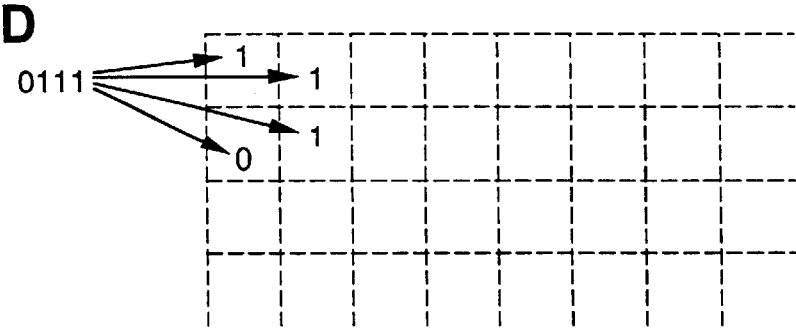
Figure 10E:
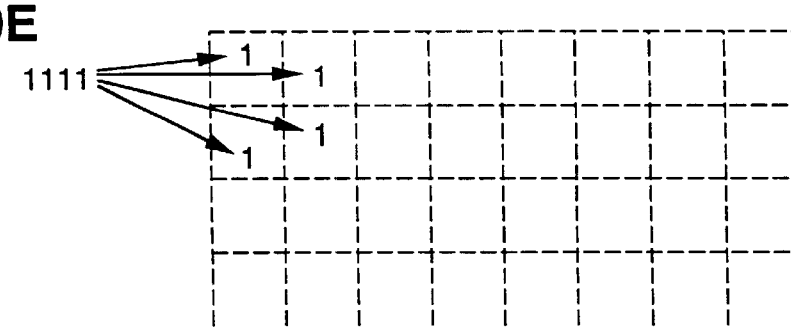

FIGS. 9A and 9B show the case of the print data (binary data) of the yellow components. FIG. 9A shows the case wherein data is "0", and FIG. 9B shows the case wherein data is "1". FIGS. 10A to 10E show the cases wherein the print data (quinary data) of the magenta, cyan, and black components are respectively "0000", "0001", "0011", "0111", and "1111" in binary notation, and in these cases, 4-bit data is developed to extend over two scan lines.

Figure 11:
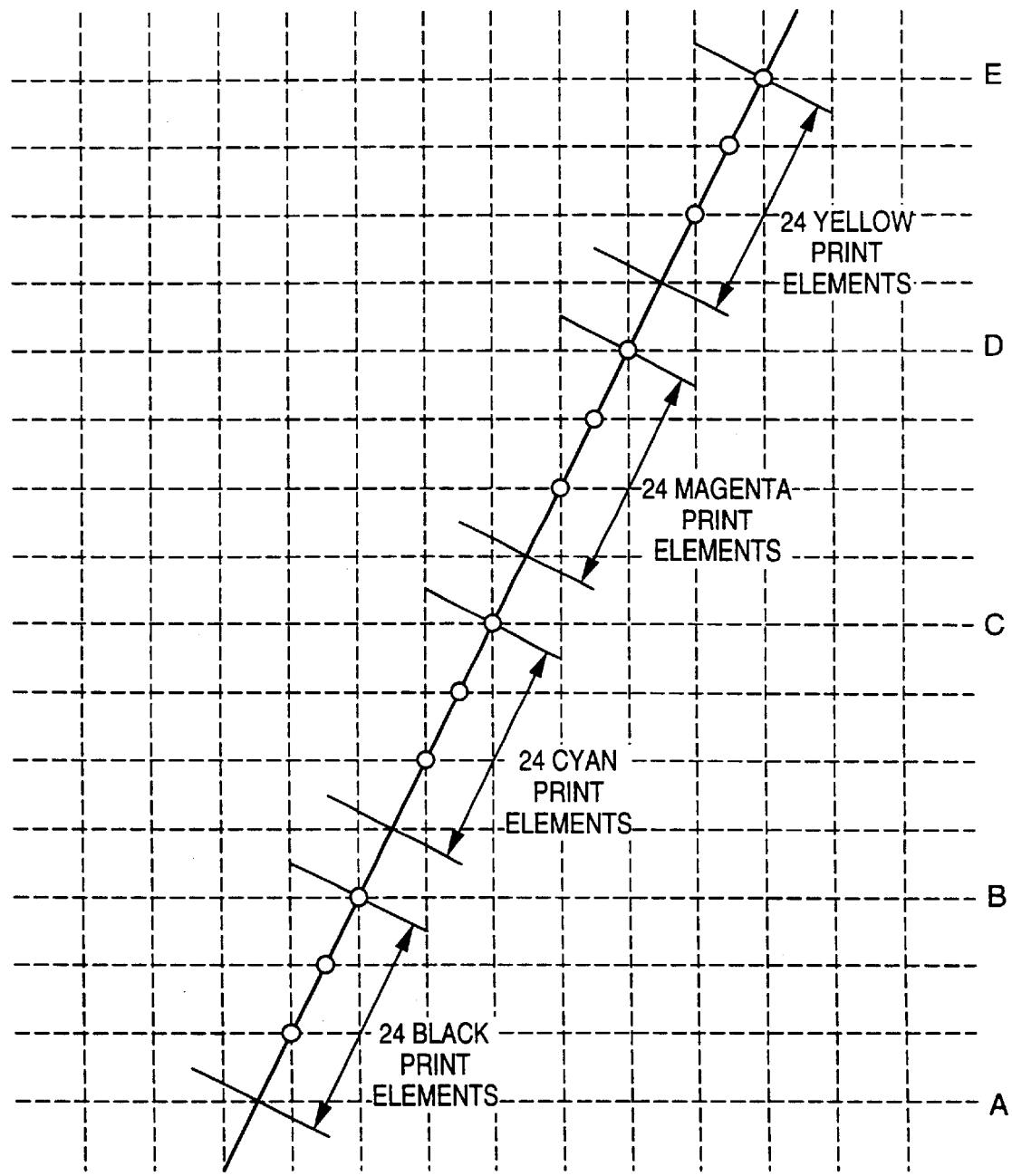
FIG. 11 is a view for explaining the relationship between the print elements and print positions of the printhead in the first embodiment of the present invention.

FIG. 11 shows the layout of the print elements in the printhead unit 21 of the ink-jet printer apparatus of the first embodiment. As can be seen from FIG. 11, the print elements of the printhead unit 21 are arranged obliquely with respect to the scanning direction of the carriage unit 2.

As the print elements of the printhead unit 21 used in printing on a printing medium, 24 print elements each are arranged in the order of black, cyan, magenta, and yellow from the paper feed side (lower side in FIG. 11) with respect to the feed direction of the printing medium. The interval between adjacent print element groups corresponds to 8 elements. As described above, the ink ejection amount from each yellow print element is controlled to be different from that from other color print element groups, so that the diameter of one dot printed by one black, cyan, or magenta ink to that of one dot printed by one yellow ink is "1:2". In the first embodiment, the pitches of the print elements in the individual color print element groups are equal to each other. Also, the intersections of dotted lines in FIG. 11 correspond to pixel positions printed in yellow.

Upon printing the print elements are driven to print based on the binary data developed on the print buffers corresponding to the individual colors. At this time, printing is performed while setting the pitch of pixels (dots) printed in yellow in the main scanning direction to be twice that of pixels printed in magenta, cyan, and black in this direction. More specifically, printing is performed while driving the print elements for printing magenta, cyan, and black dots at a ×1/2 driving period (twice frequency) with respect to the print elements for printing yellow dots. The magenta, cyan, and black print elements are driven at positions offset by half an element in the sub-scanning direction, i.e., positions shown in the lower sides of FIGS. 10A to 10E.

More specifically, the print operation will be described below. In the first print process, a print scan for 24 scan lines is performed on the basis of yellow, magenta, cyan, and black print data. Thereafter, the printing medium is fed in the forward direction by half the pitch of the print elements. In the second print process, a print scan for 24 scan lines for each of magenta, cyan, and black is performed on the basis of magenta, cyan, and black print data except for yellow data. Thereafter, the printing medium is fed by 24 elements in the forward direction. By repeating these first and second print processes, printing can be attained at different resolutions corresponding to the colors to be printed.

Figure 12:
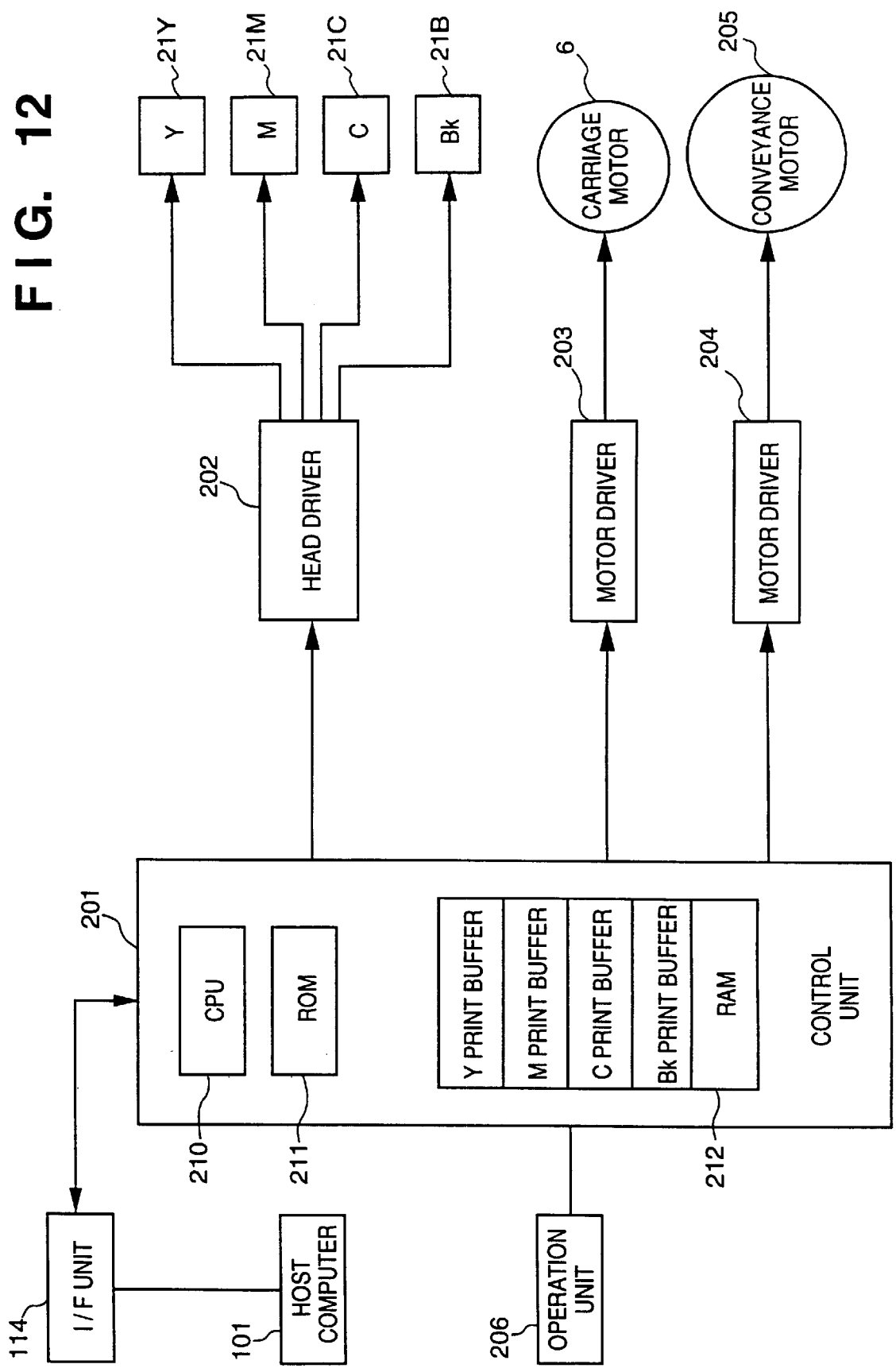
FIG. 12 is a block diagram showing the arrangement of the ink-jet printer apparatus of the first embodiment.

FIG. 12 is a block diagram showing the arrangement of the ink-jet printer 102 of this embodiment, and the same reference numerals in FIG. 12 denote the same parts as in the above drawings.

Reference numeral 201 denotes a control unit for controlling the operation of the overall apparatus. The control unit 201 comprises a CPU 210 such as a microprocessor, a ROM 211 that stores the control program to be executed by the CPU 210 and various data, a RAM 212 which is used as a work area upon execution of various kinds of processing by the CPU 210 and temporarily stores various data, and the like. The RAM 212 is allocated with the above-mentioned reception buffer 115, and Y, M, C, and Bk print buffers for storing print data (image data) in correspondence with printheads 21Y, 21M, 21C, and 21B for printing data in Y, M, C, and Bk colors respectively.

Reference numeral 202 denotes a head driver for driving the yellow, magenta, cyan, and black printheads 21Y, 21M, 21C, and 21B in accordance with print data of the individual colors output from the control unit 201. Reference numerals 203 and 204 denote motor drivers, which respectively drive the corresponding carriage motor 6 and a paper feed motor 205. Reference numeral 206 denotes an operation unit which is provided with a display unit such as a liquid crystal display, various operation buttons, and the like.

Figure 13:
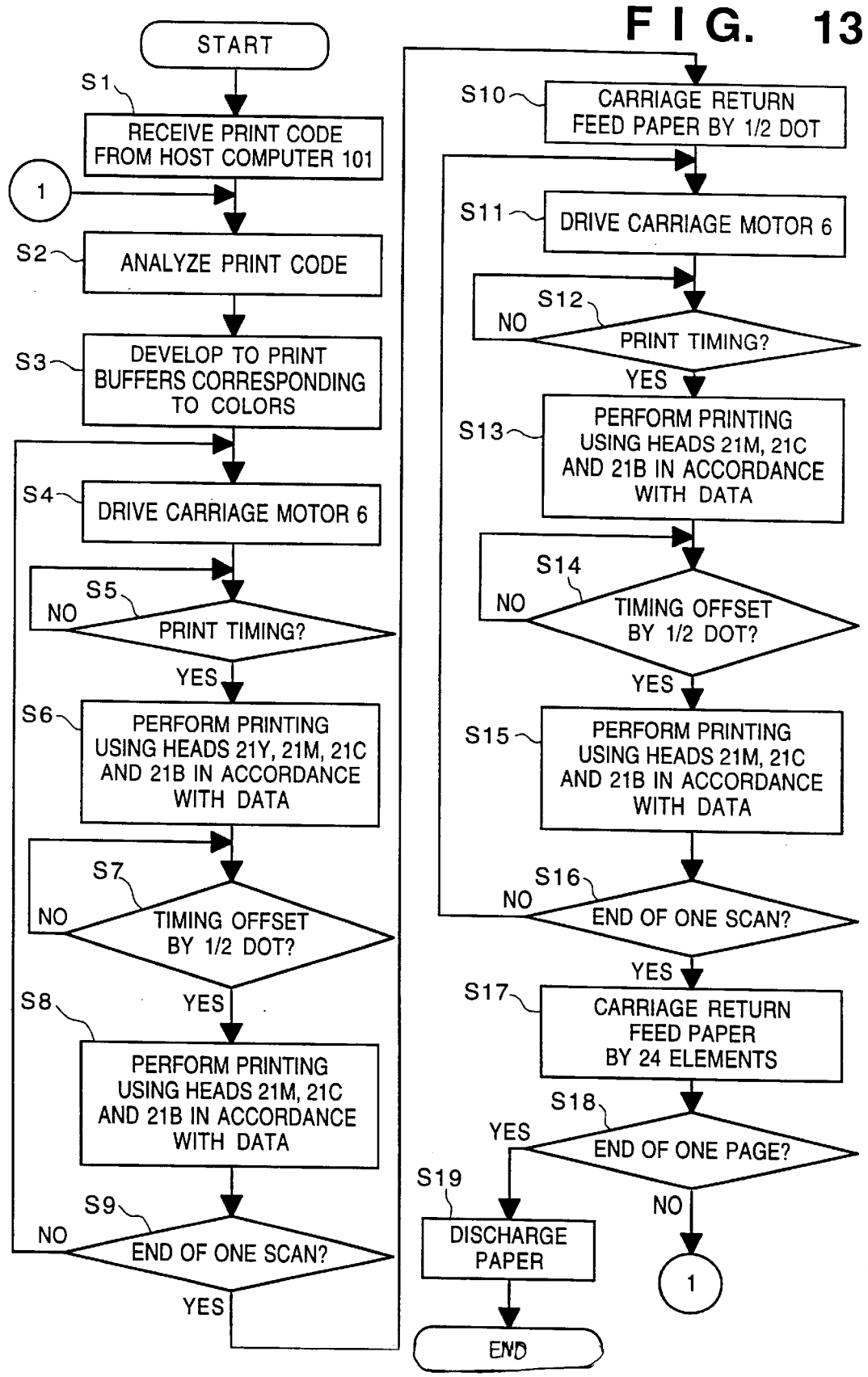
FIG. 13 is a flow chart showing the processing in the ink-jet printer apparatus of the first embodiment.

FIG. 13 is a flow chart showing the print processing executed by the CPU 210 of the control unit 201 in the ink-jet printer apparatus of this embodiment. The control program that executes this processing is stored in the ROM 211.

In step S1, print codes are received from the host computer 101 via the interface 114, and are stored in the reception buffer 115. The flow advances to step S2 to analyze the print codes stored in the reception buffer 115 (corresponding to 116 in FIG. 1). The flow advances to step S3 to generate print data of the individual colors on the basis of the analyzed print codes, and to store these print data in the print buffers of the corresponding colors (corresponding to 117 in FIG. 1). As for the amount of data stored in the print buffer of each color, the Bk print buffer stores print data for 48 scan lines, the C print buffer stores print data for 112 scan lines, the M print buffer stores print data for 176 scan lines, and the Y print buffer stores print data for 120 scan lines. These data storage amounts will be described in detail later.

The flow advances to step S4 to start driving of the carriage motor 6. It is checked in step S5 if the print timing for printing data at one intersection of dotted lines in FIG. 11 has been reached. If YES in step S5, the flow advances to step S6 to read out the corresponding print data from the print buffers of the individual colors and to output them to the heads 21Y, 21M, 21C, and 21B via the head driver 202, thus printing a dot at the intersection position in FIG. 11. The flow then advances to step S7 to check in turn if the print timing of a dot at an intermediate position between adjacent intersections in FIG. 11 has been reached. If YES in step S7, the flow advances to step S8 to read out print data from the print buffers other than that for yellow, and to output them to the heads 21M, 21C, and 21B, thus performing printing. The flow advances to step S9 to check if printing for one scan is complete. If NO in step S9, the flow returns to step S4 to execute the above-mentioned processing.

If it is determined in step S9 that printing for one scan is complete, the flow advances to step S10 to execute carriage return for returning the head unit to its home position, and to feed the print paper sheet by a distance ½ of the interval between adjacent print elements by driving the paper feed motor 205. The flow advances to step S11 to rotate the carriage motor 6 in the forward direction again. In steps S12 to S16, printing continues in the same manner as in steps S5 to S9 above. In step S13, unlike in step S6 above, the heads other than the yellow head 21Y are driven to perform printing. If it is then determined in step S16 that printing for one scan is complete, the flow advances to step S17 to execute carriage return for returning the carriage unit 2 to the home position and to feed the print paper sheet by a distance corresponding to 24 elements by driving the paper feed motor 205. In this manner, an image for a width of 24 print elements is printed by the printheads of the individual colors. The flow then advances to step S18 to check if printing for one page is complete. If NO in step S18, the flow returns to step S2 to generate the print data to be printed by the next print scan and to store them in the print buffers of the corresponding colors. In this embodiment, based on the above-mentioned arrangement of the print buffers, every time an image for 24 print elements is printed, the contents of the Bk print buffer are updated; every time an image for 48 print elements is printed, the contents of the C print buffer are updated; every time an image for 72 print elements is printed, the contents of the M print buffer are updated; and every time an image for 96 print elements is printed, the contents of the Y print buffer are updated.

Upon completion of image printing for one page, the flow advances to step S19 to discharge the printed print paper sheet, thus ending the processing.

With the above print processing, images based on print data of the individual colors are printed on one scan line, and the number of dots to be printed in the sub-scanning direction of each color equals the number of print elements of the printhead of each color, thus printing a color image for 24 print elements. When such print scan is repeated for the widths of the four color heads, an image for the width of one band (96 print elements) is printed. In this case, the print buffers corresponding to the individual colors respectively have minimum memory capacities from the scan line (A in FIG. 11) corresponding to the print element position nearest to the paper feed side of the black head 21B to the scan lines (corresponding to B, C, D, and E in FIG. 11) corresponding to the print element positions nearest to the paper discharge side of the corresponding color printheads.

More specifically, in this embodiment, the Bk print buffer has a minimum memory capacity for 48 scan lines (24×2: a value "2" is required since one pixel is printed in two scans), the C print buffer has a minimum memory capacity for 112 scan lines (48×2+8×2: the value "8" indicates the interval between the print element groups of the black and cyan heads 21B and 21C; the value "8" will indicate the color head interval hereinafter), the M print buffer has a minimum memory capacity for 176 scan lines (72×2+8×4), and the Y print buffer has a minimum memory capacity for 120 scan lines (24×4+8×3) since one yellow dot is printed on one scan line. The capacity of the print buffer for each color is expressed by the product of the number of scan lines and the number of dots in each scan line.

In this embodiment, "2,880" pixels (dots) are assumed to be printable in the main scanning direction. Therefore, the capacities of the print buffers of the individual colors are:

Black (Bk) print buffer:

48 (lines)×2,880 (pixels/line)×2 (bits/pixel)=276,480 bits

Cyan (C) print buffer:

112 (lines)×2,880 (pixels/line)×2 (bits/pixel)=645,120 bits

Magenta (M) print buffer:

176 (lines)×2,880 (pixels/line)×2 (bits/pixel)=1,013,760 bits

Yellow (Y) print buffer:

120 (lines)×2,880 (pixels/line)×1 (bits/pixel)=345,600 bits

That is, the total of the capacities of the print buffers for all the colors is a minimum of "2,280,960" bits (about 29 Kbytes).

On the other hand, if yellow print data is processed as 4-bit print data as in print data of other colors, the capacity of the Y print buffer is:

240 (lines×2,880 (pixels/line)×2 (bits/pixel)=1,382,400 bits

In this case, the total of the capacities of the print buffers for all the colors is a minimum of 3,317,760 bits. More specifically, according to this embodiment, the total of the capacities of the print buffers for all the colors can be reduced to about 70% (=0.6875).

Second Embodiment

In the first embodiment described above, the graininess is reduced by increasing the resolution (decreasing the dot size) of pixels of a color with large graininess (a color with high density). In contrast to this, in the second embodiment, the graininess is reduced by diluting ink of a color expressing large graininess. When printing is made using ink with a diluted density, the print density or saturation before the dilution is obtained by ejecting a plurality of ink droplets at a single pixel position.

In the second embodiment, printing is performed using yellow, magenta, cyan, and black inks as in the first embodiment described above. In the second embodiment as well, the graininess of yellow dots is smaller than that of other color dots. For this reason, in the second embodiment, each of inks that print magenta, cyan, and black images is diluted to set their dye or pigment concentration to be about ⅓ that of yellow ink.

Figure 14:
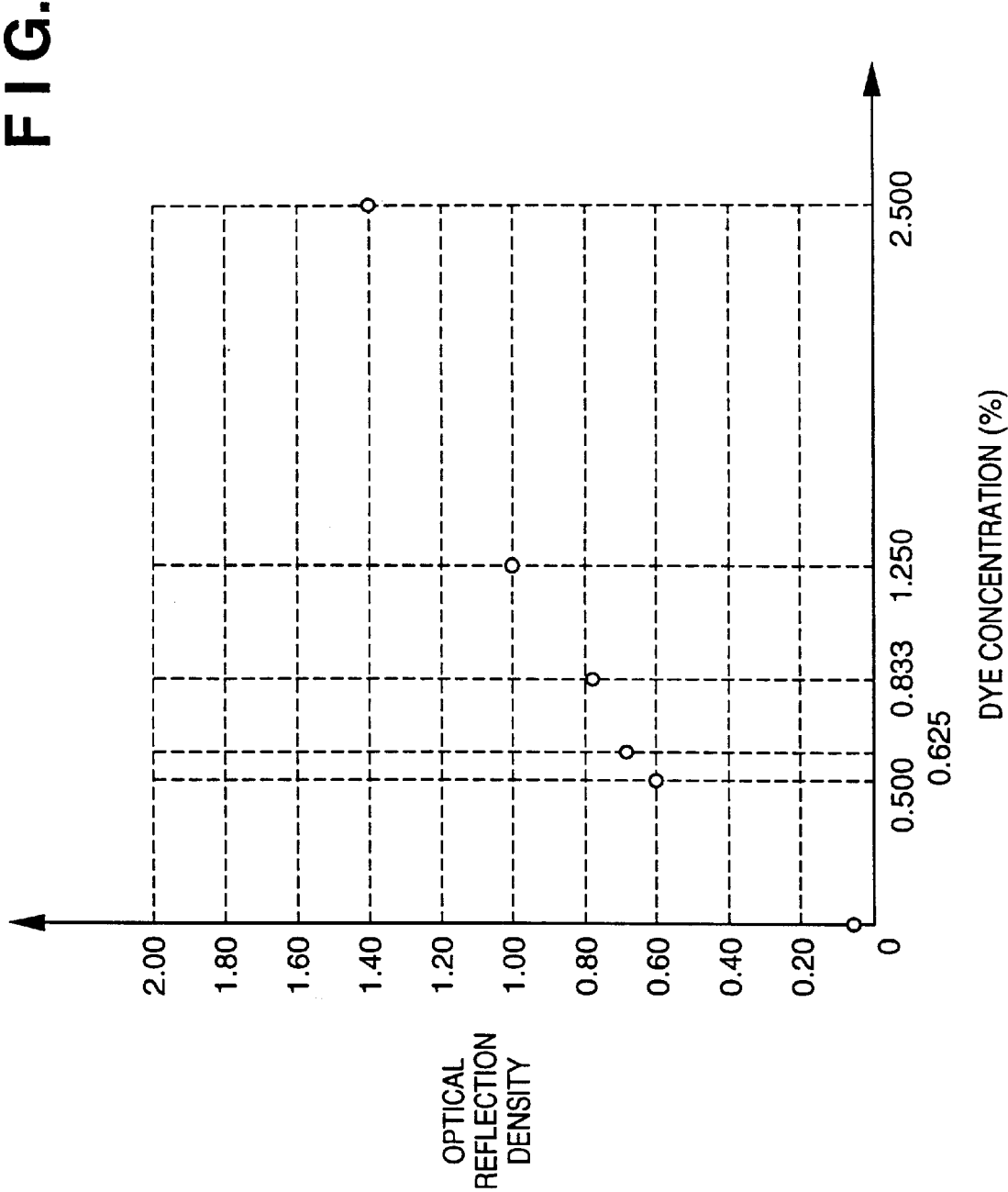
FIG. 14 is a graph showing the relationship between the dye density and the optical reflection density of printed ink dots.

FIG. 14 shows the relationship between the dye density (%) of magenta and the optically measured optical reflection density value upon solid printing.

Figure 15:
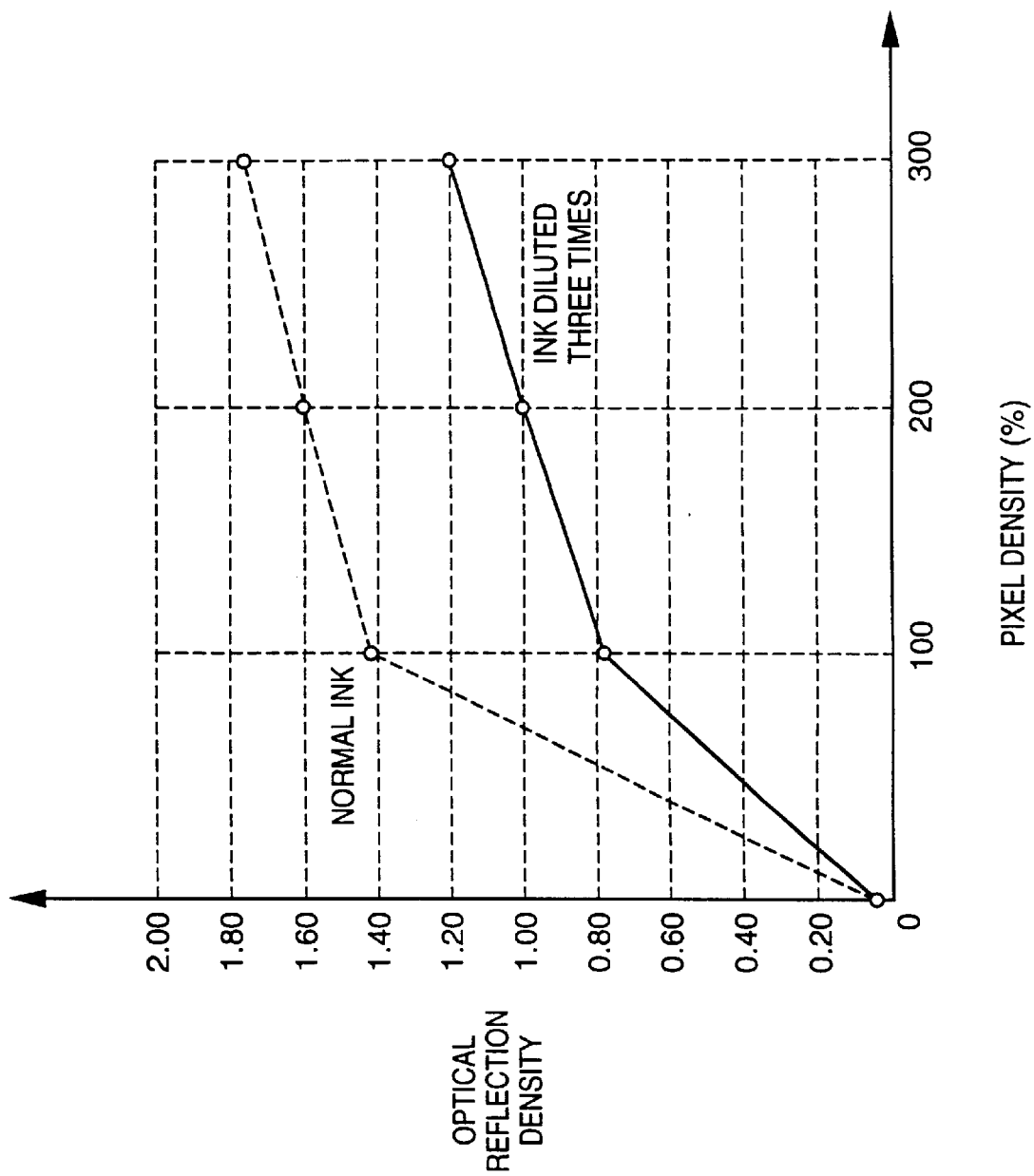
FIG. 15 is a graph showing the relationship between the pixel density and the optical reflection density printed using ink diluted three times.

In FIG. 14, as the dye density lowers to ½, ⅓, ¼, and ⅕, the optical reflection density also lowers. As can be seen from FIG. 14, when one pixel is printed by one dot using magenta, cyan, or black ink, the density of the printed image becomes lower than that printed by non-diluted ink. For this reason, in the second embodiment, three dots per pixel are printed using the diluted ink. FIG. 15 shows an example of the relationship between the magenta printed pixel density (%) and its optical reflection density in this case.

As can be seen from FIG. 15, the optical reflection density increases as the pixel density becomes higher.

In the second embodiment, one yellow pixel is printed by one dot as in the first embodiment, and one pixel of each of other colors (colors of the diluted inks) is printed by a plurality of dots (ink droplets). More specifically, one yellow pixel data is expressed by 1 bit, while one magenta, cyan, or black pixel data is expressed by 2 bits.

Figure 16:
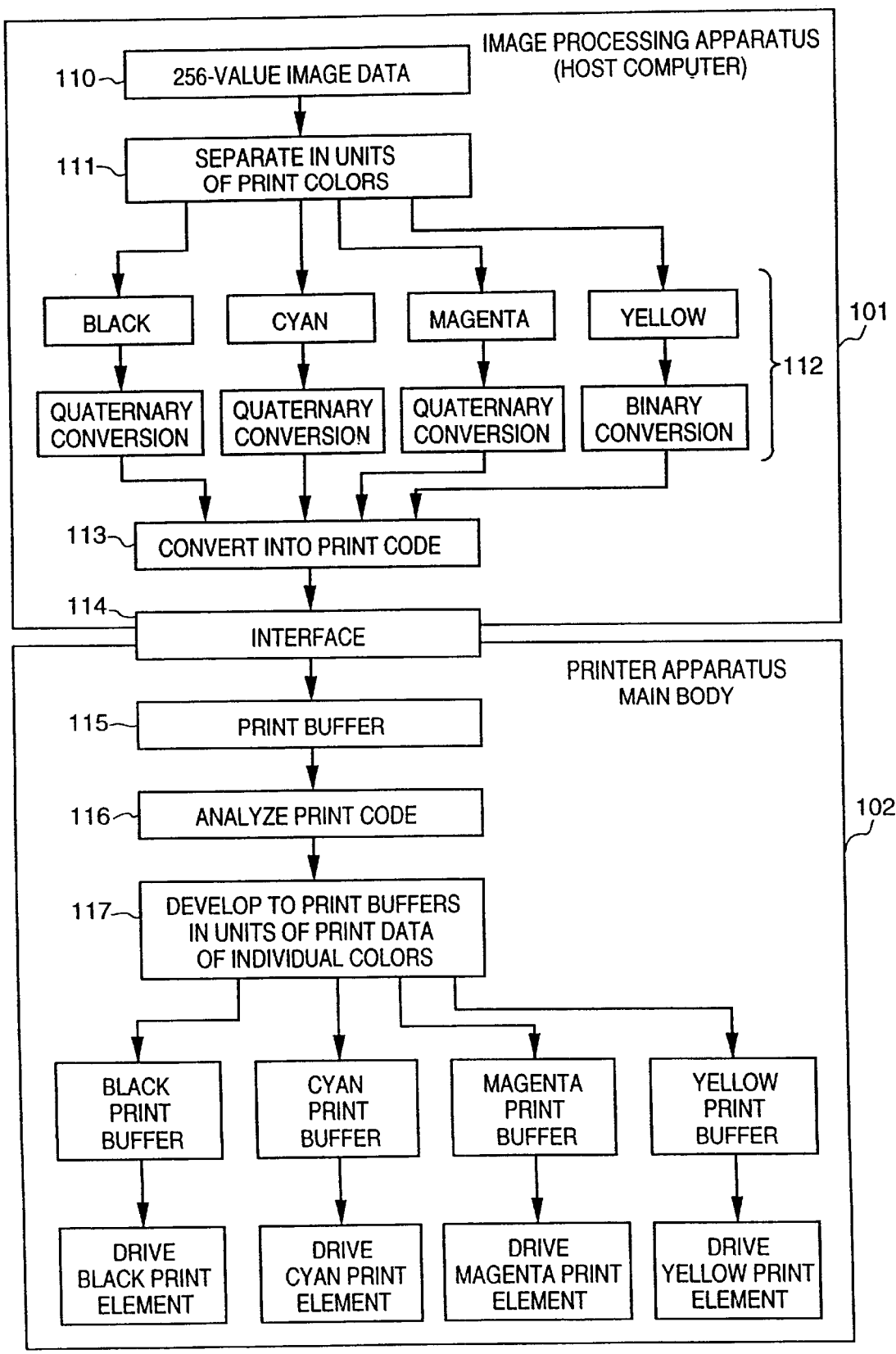
FIG. 16 is a functional block diagram showing the processing in a print system according to the second embodiment of the present invention.

FIG. 16 shows the flow of image information in the second embodiment of the present invention. In the second embodiment, the print data of each color to be processed by the host computer 101 is multi-valued data (256 values) expressed by 8 bits per pixel.

The image processing apparatus 101 such as a host computer converts 256-valued image data 110 into 256-valued data having the same resolution as that of print data of yellow components. Then, the apparatus 101 converts the image data of the yellow components into binary data, and converts other image data of magenta, cyan, and black components into quaternary data. The binary image data of the yellow components and the quaternary image data of the magenta, cyan, and black components are converted into print codes, and the converted print codes are transmitted to the ink-jet printer apparatus 102 via the interface 114 for each scan line (raster) or for scan lines for one band.

The ink-jet printer apparatus 102 receives these print codes and stores them in a reception buffer 115. Then, the binary yellow print data is developed on a Y print buffer, and the quaternary magenta, cyan, and black data are respectively developed on print buffers (M, C, and Bk print buffers) of the corresponding colors. Using these print data developed on the print buffers of the corresponding colors, pixels of the corresponding colors are printed.

Figure 17A:
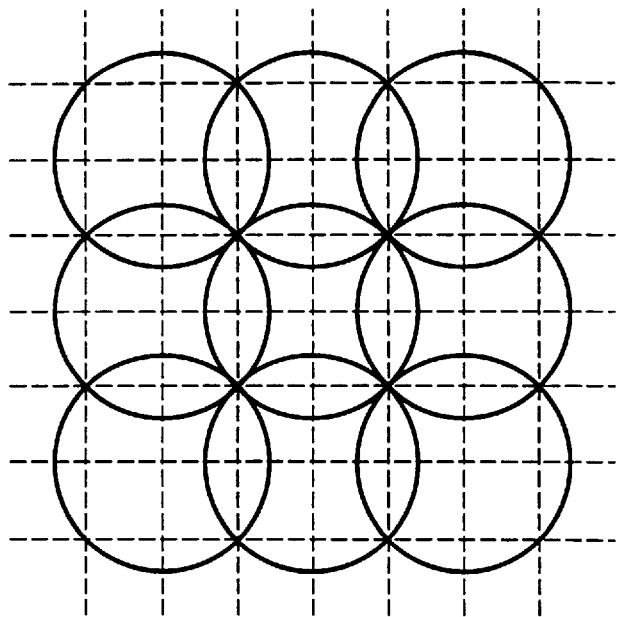
Figure 17B:
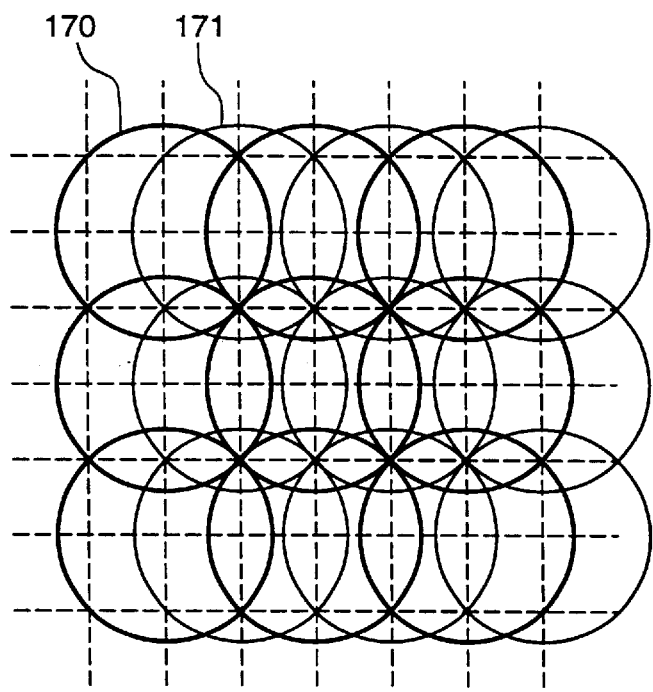

FIGS. 17A and 17B are views for explaining dots printed according to the second embodiment. FIG. 17A shows the case of yellow dots which are printed by one dot per pixel, and FIG. 17B shows the case of color dots other than yellow dots which are printed while being offset by ½ dot in the main scanning direction. In FIG. 17B, printing is performed by ejecting ink droplets onto dots indicated by circles in accordance with 2-bit data.

One pixel printed using yellow ink is made up of one dot. That is, one pixel data of a yellow component is defined by 1 bit, and one pixel data of each of magenta, cyan, and black components is defined by 2 bits. In the case of 1-bit pixel data, when the bit is set ("1"), one dot is printed; when the bit is not set ("0"), no dot is printed. On the other hand, in the case of print data expressed by 2 bits per pixel, if only the upper bit is "1" ("10"), two dots are printed; if only the lower bit is "1" ("01"), one dot alone is printed. On the other hand, if both the upper and lower bits are set ("11"), three dots are printed; if neither the upper bit nor lower bit are set ("00"), no dot is printed. This quaternary printing may be attained as follows. That is, in FIG. 17B, for example, when data is "10", dots 170 and 171 are printed; when data is "01", the dot 170 alone is printed; when data is "11", ink is overstruck on one of the dots 170 and 171. Alternatively, when data is "10", the dot 170 may be overstruck twice; when data is "01", the dot 171 alone may be printed.

Since the arrangement of the ink-jet printer apparatus of the second embodiment is the same as that of the first embodiment described above, a detailed description thereof will be omitted. As print element groups of a printhead unit of the ink-jet printer apparatus 102 of the second embodiment, 24 elements each are arranged in the order of black, cyan, magenta, and yellow from the paper feed side with respect to the feed direction of the printing medium. The interval between adjacent print element groups corresponds to eight elements.

FIG. 18 is a flow chart showing the print processing in the ink-jet printer apparatus of the second embodiment, and a control program that executes this processing is stored in the ROM 211.

In step S21, print codes are received from the host computer 101 via the interface 114, and are stored in the reception buffer 115. The flow advances to step S22 to analyze the print codes stored in the reception buffer 115 (corresponding to 116 in FIG. 16). The flow advances to step S23 to generate print data of the individual colors on the basis of the analyzed print codes, and to store these print data in the print buffers of the corresponding colors. As for the amount of data stored in the print buffer of each color, the Bk print buffer stores print data for 24 scan lines, the C print buffer stores print data for 56 scan lines (=24×2+8), the M print buffer stores print data for 88 scan lines (=24×3+16), and the Y print buffer stores print data for 120 scan lines (=24×4+24).

The flow advances to step S24 to start driving of the carriage motor 6. It is checked in step S25 if the print timing for printing data at one intersection of the dotted lines in FIG. 11 has been reached. If YES in step S25, the flow advances to step S26 to read out the corresponding print data from the print buffers of the individual colors and to output them to the heads 21Y, 21M, 21C, and 21Bk via the head driver 202, thus printing a dot at the-intersection position in FIG. 11. The flow then advances to step S27 to check in turn if the print timing of a dot at an intermediate position between adjacent intersections in FIG. 11 has been reached. If YES in step S27, the flow advances to step S28. In step S28, print data are read out from the print buffers other than the yellow print buffer, and only when the readout print data is "10" or "11", it is output to the corresponding one of the heads 21M, 21C, and 21Bk to perform printing. The flow advances to step S29 to check if printing for one scan is complete. If NO in step S29, the flow returns to step S24 to execute the above-mentioned processing. As described above, when print data is "10", no dot may be printed in step S28, and one dot may be printed in either step S33 or S35. On the other hand, when the lower bit alone of cyan, magenta, or black print data is "1" ("01"), only one dot may be printed in either step S26 or S28. If both the upper and lower bits are set ("11"), two dots may be printed in steps S26 and S28, and one dot may be overstruck on one of the dots already printed in the previous scan in step S33 or S35. In this manner, printing based on a maximum of four values can be attained.

If it is determined in step S29 that printing for one scan is complete, the flow advances to step S30 to execute carriage return for returning the head unit to its home position. The flow advances to step S31 to rotate the carriage motor 6 again. In steps S32 to S36, printing is performed as in steps S25 to S29 above. In this case, since printing is performed based on quaternary data, printing is performed in practice in one of steps S33 and S35.

If it is determined in step S36 that printing for one scan is complete, the flow advances to step S37 to execute carriage return for returning the carriage unit 2 to the home position and to feed the print paper sheet by a distance corresponding to 24 elements by driving the paper feed motor 205. In this manner, an image for a width of 24 print elements is printed by the printheads of the individual colors. The flow then advances to step S38 to check if printing for one page is complete. If NO in step S38, the flow returns to step S22 to generate the print data to be printed by the next print scan and to store them in the print buffers of the corresponding colors.

In the second embodiment, every time an image for 24 print elements is printed, the contents of the Bk print buffer are updated; every time an image for 48 print elements is printed, the contents of the C print buffer are updated; every time an image for 72 print elements is printed, the contents of the M print buffer are updated; and every time an image for 96 print elements is printed, the contents of the Y print buffer are updated. Upon completion of image printing for one page, the flow advances to step S39 to discharge the printed print paper sheet, thus ending the processing.

In the second embodiment as well, the print buffers corresponding to the individual colors respectively have minimum memory capacities from the scan line (A in FIG. 11) corresponding to the print element position nearest to the paper feed side of the black head 21Bk to the scan lines (corresponding to B, C, D, and E in FIG. 11) corresponding to the print element positions nearest to the paper discharge side of the corresponding color printheads.

In the second embodiment, the Bk print buffer has a minimum memory capacity for 24 scan lines, the C print buffer has a minimum memory capacity for 56 scan lines (24×2+8), the M print buffer has a minimum memory capacity for 88 scan lines (24×3+8×2), and the Y print buffer has a minimum memory capacity for 120 scan lines (24×4+8×3). The capacity of the print buffer for each color is expressed by the product of the number of scan lines and the number of dots in each scan line.

In the second embodiment, "2,880" pixels (dots) are assumed to be printable in the main scanning direction, as in the first embodiment. That is, the capacities of the print buffers of the individual colors are: Bk print buffer:

$$24 \text{ (lines)} \times 2,880 \text{ (pixels/line)} \times 2 \text{ (bits/pixel)} = 138,240 \text{ bits}$$

C print buffer:

$$56 \text{ (lines)} \times 2,880 \text{ (pixels/line)} \times 2 \text{ (bits/pixel)} = 322,560 \text{ bits}$$

M print buffer:

$$88 \text{ (lines)} \times 2,880 \text{ (pixels/line)} \times 2 \text{ (bits/pixel)} = 506,880 \text{ bits}$$

Y print buffer:

$$120 \text{ (lines)} \times 2,880 \text{ (pixels/line)} \times 1 \text{ (bit/pixel)} = 345,600 \text{ bits}$$

In this manner, the total of the capacities of the print buffers of all the colors is at least 1,313,280 bits. On the other hand, if yellow print data is processed as 2-bit print data, the capacity of the Y print buffer that stores yellow print data is:

$$120 \text{ (lines)} \times 2,880 \text{ (pixels/line)} \times 2 \text{ (bits/pixel)} = 691,200 \text{ bits}$$

That is, as the effect of the second embodiment, the print buffer capacity can be reduced to about 80%.

The first and second embodiments described above have exemplified the printhead arrangement in which print elements (nozzles) are arranged in a direction perpendicular to the feed direction of a printing medium. Also, when the print elements are arranged in a direction parallel to the feed direction of the printing medium, the same effect can be obtained.

The same effect can be obtained when the present invention is applied not only to a serial printer but also to a page printer.

In the first and second embodiments, print codes may be sent from the host computer to the printer apparatus in units of pages in plate of one scan line or one print scan (band) width.

When the host computer transfers print codes in consideration of the offset between adjacent print element groups of the printheads of the printer apparatus, data can be offset by scan lines corresponding to the space between adjacent print element groups. In this manner, the memory capacities of the print buffers can be further reduced.

FIG. 19 shows in detail the contact portion 19 (FIG. 3) of the head cartridge 1.

The contact portion 19 has a plurality of electrode pads, via which signals associated with ink ejection, an ID signal for identifying the head cartridge 1, and the like are exchanged after the head cartridge 1 is coupled to the ink-jet printer apparatus main body.

Another method of detecting the type of ink tank in the head cartridge 1 used in this embodiment will be explained below.

FIG. 19 is a view for explaining the method of detecting the type of ink tank in the head cartridge 1 used in this embodiment.

When the ink tanks 15 and 16 are attached to the head cartridge 1 and a hook 70 engages with projections 73 of the tanks, the ink tanks are fixed on the cartridge 1. Contact portions 71 used for detecting the type of attached ink tank are arranged in a direction in which the force of the hook 70 acts. The tank detection contact portions 71 are provided to the head cartridge 1 and the ink tanks 15 and 16. Reference numeral 72 denotes an enlarged view of each contact portion 71, which includes three electrode pads 1, 2, and 3. Although not shown, the same number of electrode pads as those on the tanks are similarly arranged on the head cartridge 1, and are electrically connected to those on the tanks at the contact portions 71. Note that electrode pads 1 and 2 of the contact portion of the ink tank 15 or 16 are electrically connectable but electrode pad 3 is electrically isolated. For example, an ink tank in such state is assumed to contain normal ink. The ink-jet printer apparatus of this embodiment energizes these electrode pads via the contact portion 71 of the cartridge 1 side, which is in contact with the electrode pads of the ink tank, thereby detecting the type of ink contained in the attached ink tank.

More specifically, in the example shown in FIG. 19, a current flows between electrode pads 1 and 2, but does not flow between electrode pads 1 and 3 and between electrode pads 2 and 3. This state is stored in advance in, e.g., the ROM of the ink-jet printer apparatus main body to indicate the normal ink tank is attached. In contrast to this, when, for example, electrode pad 3 of an ink tank that stores low-density ink is set in an electrically connectable state, it can be determined that ink contained in this ink tank is different from that in the normal ink tank.

In this embodiment, the number of electrode pads used for identifying the type of ink in an ink tank is three. When the number of electrode pads is increased, a larger number of different types of inks contained in ink tanks can be identified.

Furthermore, whether or not the head cartridge 1 is exchanged can be detected by checking the energization state via the contact portion 19 shown in FIG. 3.

In the above embodiments, the driver of the host computer discriminates the type of head cartridge attached upon printing, and automatically sets the print mode in correspondence with the discriminated type of head cartridge, thus controlling the color processing in the driver and processing in the controller in association with each other.

In contrast to this, in this embodiment, the user can arbitrarily set the print mode on the display screen of the host computer so as to reliably select the print mode according to his or her purpose.

Figure 20:
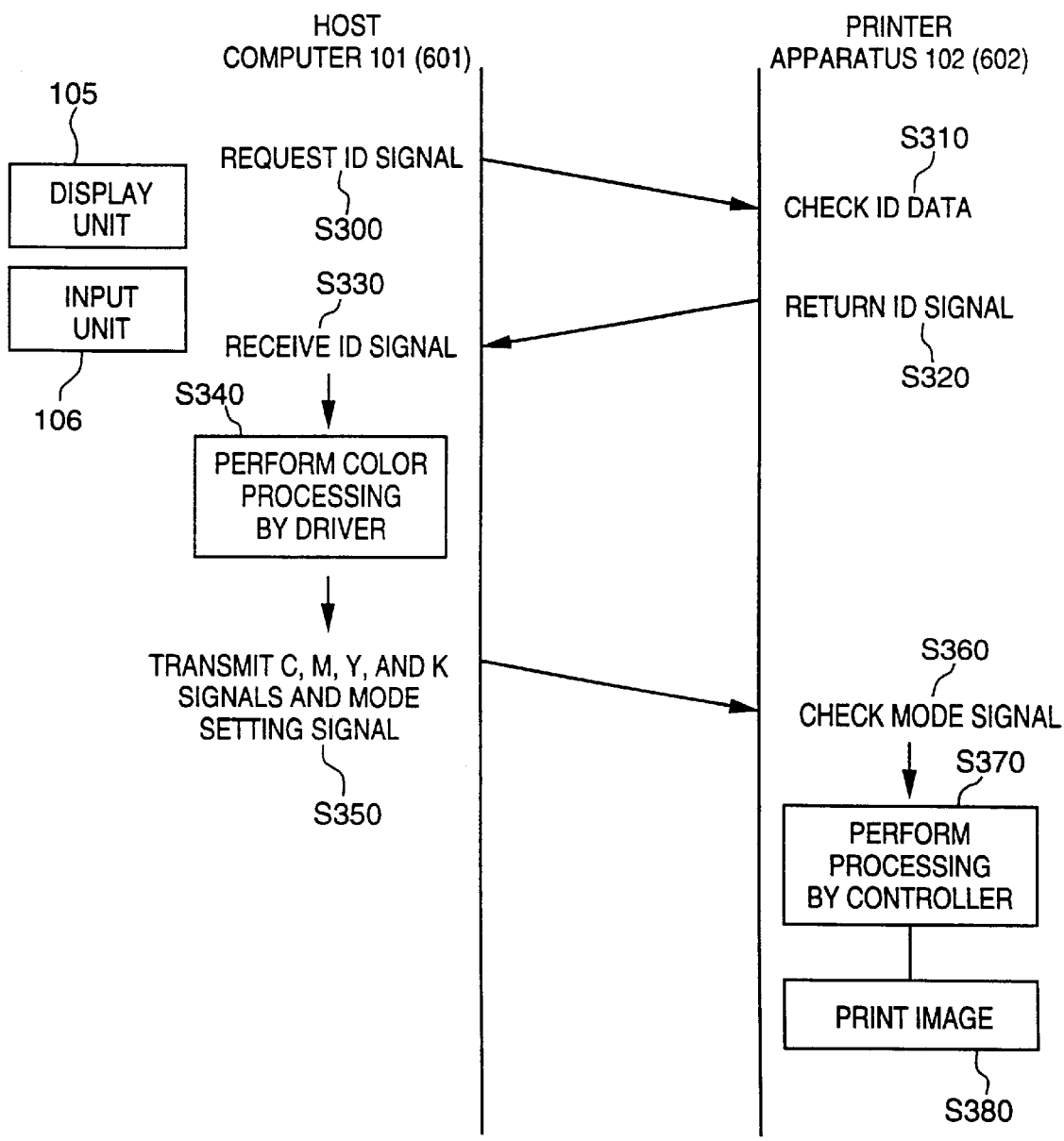
FIG. 20 is a chart showing the data exchange between a host computer and the printer apparatus in the second embodiment.

FIG. 20 is a view for explaining data exchange between the host computer 101 (601) and the printer apparatus 102 (602). In FIG. 20, reference numeral 105 denotes a display unit such as a CRT, a liquid crystal display, or the like; and 106, an input unit such as a keyboard, a mouse, or the like.

The operation of FIG. 20 will be briefly described below. The host computer 101 inquires the printer apparatus 102 of the type of attached cartridge (S300). In response to this inquiry, the printer apparatus 102 reads the ID of the attached cartridge, and discriminates the type of cartridge 1 attached (S310). Then, the printer apparatus 102 sends back the ID signal to the host computer 101 (S320). Upon reception of the ID signal (S330), the host computer 101 performs color processing for image data using a printer driver in correspondence with the color of the cartridge (S340), and transmits generated color signals (C, M, Y, and K signals) and a mode signal to the printer apparatus 102 (S350). Upon reception of these signals, the printer apparatus 102 performs image development and the like by a controller (S370) and prints an image (S380).

Since the functional arrangement of the host computer 101 and the printer apparatus 102 in this embodiment is the same as that in the above embodiment, a detailed description thereof will be omitted.

When the host computer 101 and the printer apparatus 102 are connected via a one-way communication, the host computer 101 sets a print mode using a predetermined head cartridge or the like, and instructs the printer apparatus 102 to execute print processing corresponding to the set mode. If the condition of the set print mode matches the type of printhead attached at that time or the print mode in the printer apparatus 102, the print processing is executed; otherwise, the printer apparatus 102 sends back, e.g., an error signal. In response to this signal, the user of the host computer 101 checks the type of printhead, and the like attached to the printer apparatus 102 and sets the mode again.

Figure 21:
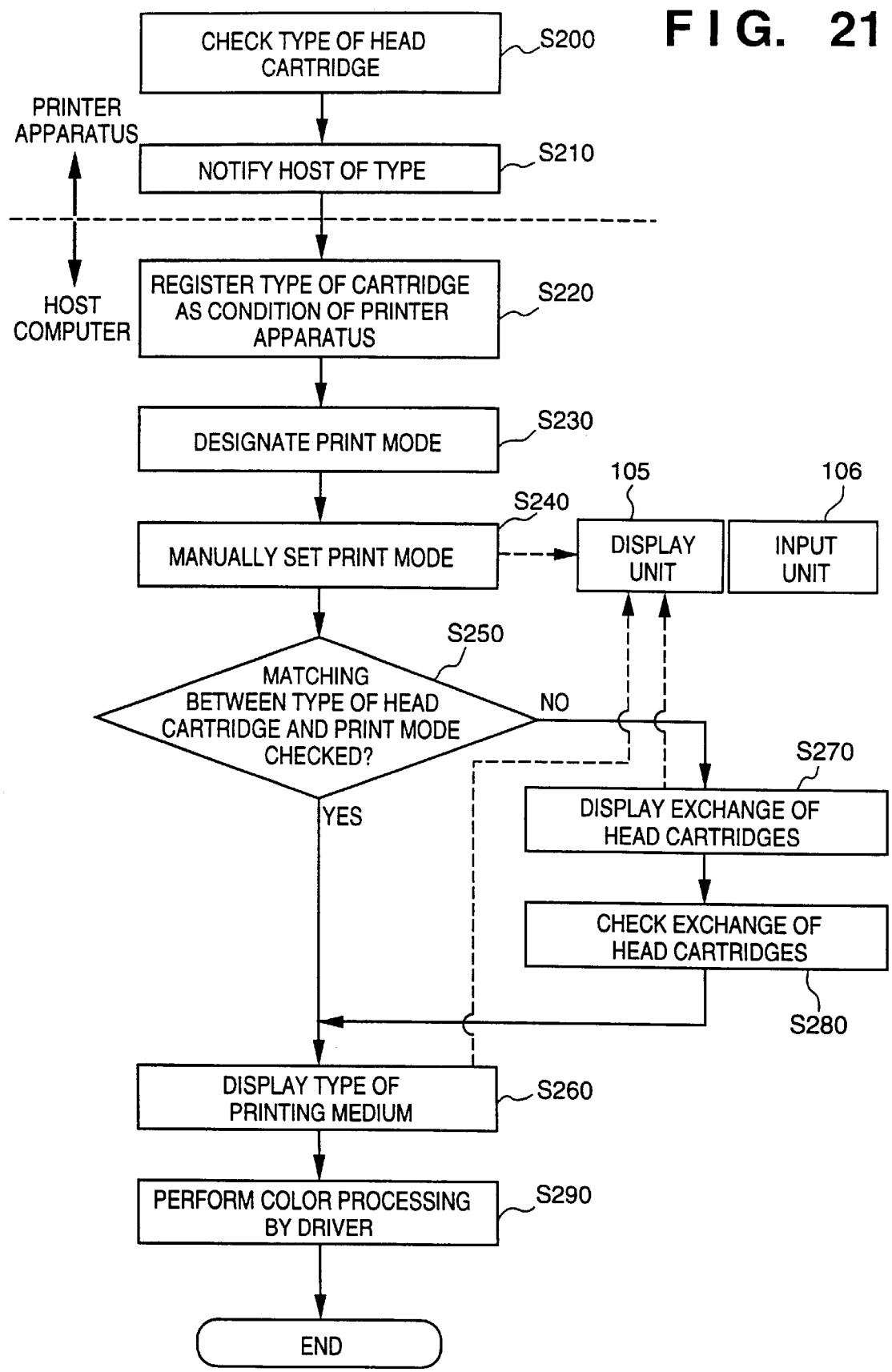
FIG. 21 is a flow chart showing the print mode setting processing-in the second embodiment.

FIG. 21 is a flow chart showing the print mode setting processing in this embodiment.

When the power switch of the printer apparatus 102 is turned on and the head cartridge 1 is attached, the type of head cartridge is checked based on the ID of the head cartridge as in the above embodiment (S200). An ID signal indicating the checking result in step S200 is supplied to the host computer 101 (S210). These steps S200 and S210 are processing operations on the printer apparatus 102 side. The subsequent processing is executed by the host computer 101.

Based on the ID signal received from the printer apparatus 102, the type of head cartridge 1 currently attached to the printer apparatus 102 is registered as the state of the printer apparatus 102 together with the type of printer apparatus 102 (S220). The user then selects the print mode (S230). In this case, the user manually sets the print mode corresponding to his or her purpose using the input unit 106 on the basis of a user interface (UI), as shown in, e.g., FIG. 22, displayed on the screen of the display unit 105 of the host computer 101 (S240).

In this embodiment, the print mode corresponds to the type of head cartridge 1. More specifically, the normal mode corresponds to ID1; pictorial mode 1, ID2; pictorial mode 2, ID3; and the black & white mode, ID0, respectively.

As has been described in the above embodiments, the head cartridge 1 corresponds to the print mode. Accordingly, whether or not the head cartridge 1 corresponding to the set print mode is attached is discriminated by checking the type of head cartridge registered in step S220 (S250).

If the head cartridge 1 corresponding to the set print mode is attached, a message guiding the user to set a printing medium corresponding to the print mode is displayed on the display unit 105 for the user. In this embodiment, the normal mode can cope with any of normal paper, coated paper, and pictorial paper. Therefore, when the normal mode is set, a message shown in, e.g., FIG. 23 is displayed for the user.

On the other hand, if the head cartridge corresponding to the set print mode is not attached, it is instructed to attach another head cartridge corresponding to the print mode (S270). For example, if the current head cartridge is for the normal mode (ID=1) but pictorial mode 1 is set as the print mode, a message shown in FIG. 24 is displayed to prompt the user to switch the head cartridge of an appropriate type (the head cartridge of ID=2). It is confirmed by repeating steps S200, S210, S220, and S250 above if the-type of head cartridge 1 is exchanged to one corresponding to the print mode (S280). After the head cartridge 1 and printing medium corresponding to the print mode are set in this manner, the printer driver of the host computer starts color processing (S290). Thereafter, the same processing as in the above embodiment is performed.

As described above, according to this embodiment, images can be reliably formed in the print mode matching the user's purpose, and print errors arising from setting errors of the print mode can be prevented.

When the normal mode or black & white mode is set, since the type of printing medium is not limited, the processing in step S260 may be skipped. With this processing, since the number of times of warning display can be reduced, a more user friendly UI (user interface) can be provided.

When the host computer 101 and the printer apparatus 102 are connected via a one-way communication, the printer driver of the host computer 101 sets a print mode using a predetermined head cartridge on the basis of a user's manual instruction input from the input unit 106. On the other hand, the controller of the printer apparatus 102 automatically discriminates the type of cartridge as in the above embodiment, and automatically sets the print mode on the basis of the discriminated type of head cartridge. The controller then receives image data output from the printer driver via a one-way communication line, and data indicating the print mode on the basis of the user's manual instruction. When the print mode received from the host computer 101 matches that set by the controller of the printer apparatus 102, the print processing is executed. However, when they do not match, the printer apparatus 102 displays an error message on the operation unit 206 to inform the user of the errors. With this message, the user sets the print mode again by confirming the printhead currently attached to the printer apparatus 102. In this manner, image printing in the mismatched print mode can be prevented. Accordingly, print errors can be eliminated.

Figure 25:
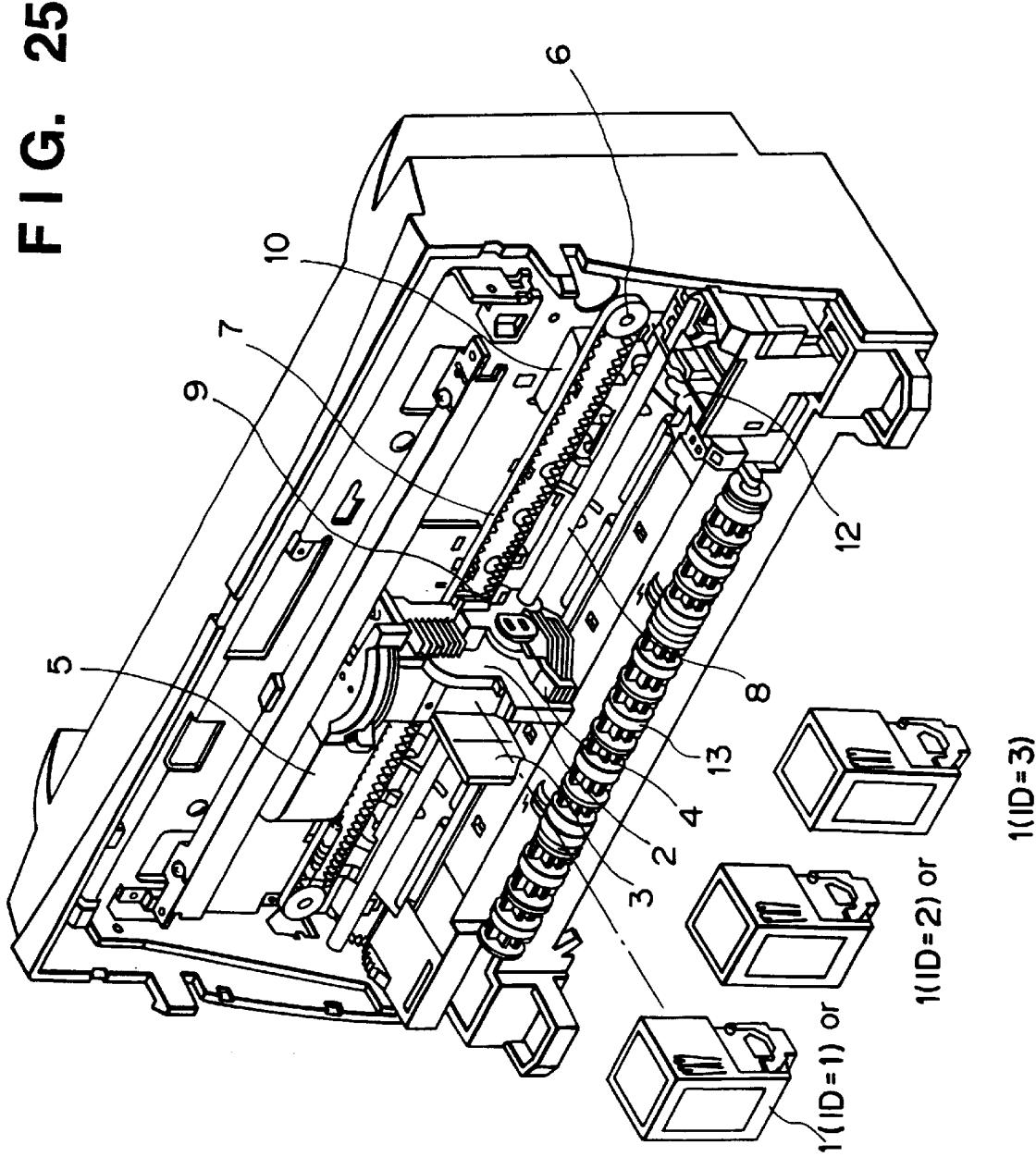
FIG. 25 is a perspective view showing printhead cartridges using different inks, and the printer apparatus main body in the second embodiment.

FIG. 25 shows head cartridges with different ink types, and the printer apparatus main body.

These head cartridges 1 are assigned IDs that can be recognized by the printer apparatus. The dye densities of inks in a head cartridge with ID="1" are: 2.5% (yellow), 3.0% (magenta), 2.7% (cyan), and 2.6% (black). The dye densities of inks in a head cartridge with ID="2" are: 2.5% (yellow), 1.0% (magenta), 0.9% (cyan), and 1.3% (black). On the other hand, the dye densities of inks in a head cartridge with ID="3" are: 2.5% (yellow), 0.8% (magenta), 0.7% (cyan), and 0.9% (black).

In this embodiment, when the ink cartridge with ID=1 is attached, one pixel can be satisfactorily expressed by setting binary yellow, magenta, cyan, and black gradation data. On the other hand, when the ink cartridge with ID=2 is attached, one pixel can be satisfactorily expressed by setting binary yellow and black gradation data and quaternary magenta and cyan gradation data. Furthermore, when the ink cartridge with ID=3 is attached, one pixel can be satisfactorily expressed by setting binary yellow gradation data, quinary magenta and cyan gradation data, and ternary black gradation data.

More specifically, in the ink cartridge with ID=1, one pixel data is expressed by 1-bit yellow, magenta, cyan, and black data. In the ink cartridge with ID=2, one pixel data is expressed by 1-bit yellow data and 2-bit cyan, magenta, and black data. Furthermore, in the ink cartridge with ID=3, one pixel data is expressed by 1-bit yellow data, 3-bit magenta and cyan data, and 2-bit black data.

In this printer apparatus, the configurations of the print buffers are made different in correspondence with the ID of the head cartridge attached. When the head cartridge with ID=1 is attached, the print buffers of all the colors have the 1-bit configuration. When the head cartridge with ID=2 is attached, the print buffer for yellow data has the 1-bit configuration, and the print buffers for other colors have the 2-bit configuration. Furthermore, when the head cartridge with ID=3 is attached, the print buffer for yellow data has the 1-bit configuration, the print buffers for magenta and cyan data have the 3-bit configuration, and the print buffer for black data has the 2-bit configuration.

As described above, when the user selects a head cartridge in correspondence with the image and printing medium in question, the number of gradation levels of the image to be printed can be changed. In this case as well, by suppressing the gradation of yellow data with high lightness, an increase in capacity of the print buffer can be suppressed.

Each of the embodiments described above can attain high-density, high-resolution printing using, especially, a system, which comprises means (e.g., an electrothermal transducer, laser beam, and the like) for generating heat energy as energy utilized upon execution of ink ejection, and causes a change in state of an ink by the heat energy, among the ink-jet printing schemes.

As the representative arrangement and principle of such ink-jet printing system, one practiced by use of the basic principle disclosed in, for example, U.S. Pat. Nos. 4,723,129 and 4,740,796 is preferred. The above system is applicable to either one of so-called on-demand type and continuous type. Particularly, in the case of the on-demand type, the system is effective because, by applying at least one driving signal, which corresponds to printing information and gives a rapid temperature rise exceeding nucleate boiling, to each of electrothermal transducers arranged in correspondence with a sheet or liquid channels holding liquid (ink), heat energy is generated by the electrothermal transducer to effect film boiling on the heat acting surface of the printhead, and consequently, a bubble can be formed in the liquid (ink) in one-to-one correspondence with the driving signal. By ejecting the liquid (ink) through an ejection opening by growth and shrinkage of the bubble, at least one ink droplet is formed. If the driving signal is applied as a pulse signal, the growth and shrinkage of the bubble can be attained instantly and adequately to achieve ejection of the liquid (ink) with particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of orifices, liquid channels, and electrothermal transducers (linear liquid channels or right-angled liquid channels) as disclosed in the above specifications, the arrangement using U.S. Pat. Nos. 4,558,333 and 4,459,600, which disclose an arrangement having a heat acting portion arranged in a bent region may be used. In addition, an arrangement based on Japanese Patent Laid-Open No. 59-123670 which discloses an arrangement using a slit common to a plurality of electrothermal transducers as an ejection portion of the electrothermal transducers, or Japanese Patent Laid-Open No. 59-138461 which discloses an arrangement having an opening for absorbing a pressure wave of heat energy in correspondence with an ejection portion, may be used.

In addition, an exchangeable chip type printhead which can be electrically connected to the apparatus main body or can receive ink from the apparatus main body upon being mounted on the apparatus main body, or a cartridge type printhead in which an ink tank is integrally arranged on the printhead itself may be used.

It is preferable to add recovery means for the printhead, preliminary auxiliary means, and the like provided as an arrangement of the printer of the present invention since the print operation can be further stabilized. Examples of such means include, for the printhead, capping means, cleaning means, pressurization or suction means, and preliminary heating means using electrothermal transducers, another heating element, or a combination thereof. It is also effective to execute a preliminary ejection mode which performs ejection independently of printing.

Furthermore, as for the print mode of the printer apparatus, the present invention is effective for not only an apparatus having a print mode using only a primary color such as black or the like, but also an apparatus having at least one of a multi-color mode using a plurality of different colors or a full-color mode achieved by color mixing, although such modes may be attained either by using an integrated printhead or by combining a plurality of printheads.

Moreover, in each of the above-mentioned embodiments, the liquid is described as ink. Alternatively, the present invention may employ ink which solidifies at room temperature or less and softens or liquefies at room temperature, or ink which liquefies upon application of a print signal, since it is a common practice to perform temperature control of the ink itself within the range from 30° C. to 70° C. in the ink-jet system, so that the ink viscosity can fall within the stable ejection range.

In addition, in order to prevent a temperature rise caused by heat energy by positively utilizing it as energy for a change in state of the ink from the solid state to the liquid state, or to prevent evaporation of the ink, ink which solidifies in a non-use state and liquefies by heating may be used. In any case, the present invention can be applied to a case wherein ink which liquefies by applied heat energy, such as ink which liquefies upon application of heat energy according to a print signal and is ejected in a liquid state, ink which begins to solidify when it reaches a printing medium, or the like, is used. In this case, the ink may oppose electrothermal transducers while being held in the liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer apparatus according to the present invention may be used as an image output terminal of an information processing equipment such as a computer, or a copying machine combined with a reader, and the like.

The color property (including black) in this embodiment represent, in principle, the degree of strength of color development of ink itself or the strength of color development in the state wherein the ink is printed on a printing medium, and represent the degree of brightness in the case of achromatic color. In this sense, when identical dyes or pigments are used, the color property may represent the dye density of ink. When such characteristics are compared while inks are printed on the printing medium, the color property may represent the optical reflection density or comparison of maximum saturations with nearly equal hues. That is, color property presenting high color development is determined to be excellent.

Note that the present invention may be applied to either a system constituted by a plurality of devices or an apparatus consisting of a single device. The present invention can also be applied to a case wherein the invention is achieved by supplying a program to the system or apparatus, needless to say. In this case, a storage medium that stores the program according to the present invention constitutes the present invention. By loading the program from the storage medium to the system or apparatus, the system or apparatus operates in a predetermined way.

In the above embodiments, the host computer separates multi-valued image data into data corresponding to the individual colors, and performs binary conversion or multi-value conversion processing in correspondence with the colors. However, the present invention is not limited to this. For example, the printer apparatus main body may have such function. In place of outputting print codes from the host computer to the printer apparatus, the host computer may transmit data developed to print data to the printer apparatus.

As described above, according to the above embodiments, the print data amount corresponding to a color with small graininess is reduced, and the resolution of data of a color with large graininess is increased, thus eliminating graininess in the printed image.

Also, according to the present invention, since the print data amount corresponding to a color with small graininess is reduced, an increase in memory capacity of the printer apparatus main body to attain higher resolution can be suppressed.

The present invention is not limited to the above embodiments and various changes and modifications can be made within the spirit and scope of the present invention. Therefore, to apprise the public of the scope of the present invention, the following claims are made.

What is claimed is:

1. An ink-jet printer for printing an image by ejecting ink from a plurality of print heads onto a printing medium, comprising:

a plurality of print heads for ejecting inks each having a different color and lightness level from each other;

data generation means for generating print data having a first resolution for supply to a print head that ejects a first ink other than black, with a first lightness level and a first color, and print data having a second resolution higher than the first resolution for supply to a print head that ejects a second ink other than black, with a second lightness level lower than the first lightness level and a second color different from the first color;

supply means for supplying the print data generated by said data generation means to corresponding print heads; and print means for driving said plurality of print heads on the basis of the print data supplied from said supply means.

2. The apparatus according to claim 1, wherein the print data having the first resolution is binary data.

3. The apparatus according to claim 1, wherein the print data having the second resolution is multi-valued data.

4. The apparatus according to claim 1, wherein the ink with the first lightness level is yellow ink.

5. The apparatus according to claim 1, further comprising first storage means for storing the print data having the first resolution and second storage means for storing the print data having the second resolution.

6. The apparatus according to claim 5, wherein said print means prints the print data at predetermined frequencies, with the print data having the second resolution being printed at a frequency higher than a print frequency of the print data having the first resolution.

7. The apparatus according to claim 5, wherein the second resolution is higher than the first resolution in both a main scanning direction and sub-scanning direction.

8. An ink-jet printing apparatus for printing an image on a printing medium using a print head having a plurality of print elements for ejecting ink, said print head having a plurality of print element groups for respectively ejecting yellow, cyan, magenta, and black inks, comprising:

data generation means for generating print data having a first resolution for supply to the print element group that ejects the yellow ink with high lightness level, and print data having a second resolution higher than the first resolution for supply to another one of the print element groups that ejects another ink with low lightness level;

first print means for performing printing in accordance with the print data having the first resolution and expressed by binary data using the print element group for ejecting the yellow ink;

first storage means for storing the print data having the first resolution and expressed by the binary data;

second print means for performing printing in accordance with the print data having the second resolution higher than the first resolution and expressed by multi-valued data using the print element group other than the print element group for ejecting the yellow ink; and second storage means for storing the print data having the second resolution and expressed by the multi-valued data.

9. The apparatus according to claim 8, wherein the print element group for ejecting the yellow ink is arranged on a downstream side with respect to the other print element group in a feed direction of the printing medium.

10. An ink-jet print method for printing an image by ejecting ink from a plurality of print heads onto a printing medium, comprising:

a step of inputting data corresponding to inks each having different colors and lightness levels;

a step of generating print data having a first resolution for supply to a print head that ejects a first ink other than black, with a first lightness level and a first color, and print data having a second resolution higher than the first resolution for supply to a print head that ejects a second ink other than black, with a second lightness level lower than the first lightness level and a second color different from the first color, based upon the data inputted in said inputting step; and a step of performing printing by ejecting the inks having different colors and lightness levels in accordance with the print data.

11. The method according to claim 10, further comprising a binary conversion step of converting the print data corresponding to the ink with the first lightness level into binary data.

12. The method according to claim 11, wherein the ink with the first lightness level is yellow ink.

13. The method according to claim 10, further comprising a multi-vale conversion step of converting the print data corresponding to the ink with the second lightness level into multi-valued data.

14. The method according to claim 10, wherein printing at the second resolution is performed at a frequency higher than a print frequency of printing performed for the first resolution.

15. The method according to claim 10, wherein the second resolution is higher than the first resolution in both a main scanning direction and a sub-scanning direction.

16. The method according to claim 10, wherein printing at the second resolution is performed using diluted ink and printing one pixel by overlapping a plurality of ink droplets.

17. The method according to claim 10, wherein printing at the second resolution is performed using diluted ink and forming one pixel using a plurality of ink dots.

18. An ink-jet print method for printing an image on a printing medium using a print head having a plurality of print elements for ejecting ink, said print head having a plurality of print element groups for respectively ejecting yellow, cyan, magenta, and black inks, comprising:

a step of generating print data having a first resolution for supply to the print element group that ejects the yellow ink, and print data having a second resolution higher than the first resolution for supply to another print element group that ejects another ink based upon input data;

a first print step of performing printing in accordance with the print data having the first resolution and expressed by binary data using the print element group for ejecting the yellow ink; and a second print step of performing printing in accordance with the print data having the second resolution higher than the first resolution and expressed by multi-valued data using the print element group other than the print element group for ejecting the yellow ink.

19. The method according to claim 18, wherein the print element group for ejecting the yellow ink is arranged on a downstream side with respect to the other print element group in a feed direction of the printing medium.

20. The method according to claim 18, wherein the second print step includes the step of printing one pixel by overlapping a plurality of ink droplets using diluted ink.

21. The method according to claim 18, wherein the second print step includes the step of forming one pixel with a plurality of ink dots using diluted ink.

22. An ink-jet printing apparatus for printing an image by ejecting ink from a print head onto a printing medium, comprising:

a mount portion for exchangeably mounting print heads which eject inks each having different colors and lightness levels;

data generation means for generating print data having a first resolution for supply to a print head that ejects a first ink other than black, with a first lightness level and a first color, and print data having a second resolution higher than the first resolution for supply to a print head that ejects a second ink other than black, with a second lightness level lower than the first lightness level and a second color different from the first color; and print means for printing by using the ink ejected by a print head mounted on said mount portion.

23. An ink-jet printing apparatus comprising:

a mount portion for exchangeably mounting a first ink-jet print head for ejecting a first ink of a first color other than black with high lightness, and a second ink-jet print head for ejecting a second ink of a second, different color other than black with low lightness;

driving means for providing a driving condition to an ink-jet print head mounted on said mount portion;

data generation means for generating print data having a first resolution for supply to the first ink-jet print head that ejects the first ink of the color with high lightness, and print data having a second resolution higher than the first resolution for supply to the second ink-jet print head that ejects the second ink of the color with low lightness; and print means for printing a plurality of different inks having different colors and lightness ejected by the ink-jet print heads mounted on said mount portion.

24. A data generating apparatus for generating print data for printing an image by ejecting ink from a plurality of print heads onto a printing medium, the plurality of print heads for ejecting inks each having a different color and lightness level from each other, said apparatus comprising:

data generation means for generating print data having a first resolution for supply to a print head that ejects a first ink other than black, with a first lightness level and a first color, and print data having a second resolution higher than the first resolution for supply to a print head that ejects a second ink other than black, with a second lightness level lower than the first lightness level and a second color different from the first color; and supply means for supplying the print data generated by said data generation means to corresponding print heads, wherein the plurality of print heads are driven on the basis of the print data supplied from said supply means.

25. A data generating process for generating print data for printing an image by ejecting ink from a plurality of print heads onto a printing medium, the plurality of print heads for ejecting inks each having a different color and lightness level from each other, said process comprising the steps of:

generating print data having a first resolution for supply to a print head that ejects a first ink other than black, with a first lightness level and a first color, and print data having a second resolution higher than the first resolution for supply to a print head that ejects a second ink other than black, with a second lightness level lower than the first lightness level and a second color different from the first color; and supplying the print data generated in said print data generating step, to corresponding print heads, wherein the plurality of print heads are driven on the basis of the print data supplied in said supplying step.

* * * * *

UNITED STATES PATENT AND TRADEMARK OFFICE
CERTIFICATE OF CORRECTION

PATENT NO. : 6,601,938 B1
DATED : August 5, 2003
INVENTOR(S) : Iwasaki et al.

It is certified that error appears in the above-identified patent and that said Letters Patent is hereby corrected as shown below:

Title page,
Item [56], References Cited, U.S. PATENT DOCUMENTS, insert:
-- 4,630,076    12/1986    Yoshimura ….    347/43
   5,142,374    8/1992     Tajika et al . …..    347/15X
   5,623,294    4/1997     Takizawa et al. ….    347/98 --.

FOREIGN PATENT DOCUMENTS, insert:
-- JP 62-161541    7/1987 --.

Column 3,
Line 38, "the-mechanical" should read -- the mechanical --.

Column 4,
Line 30, "processing-in" should read -- processing in --.

Column 5,
Line 19, "is" should be deleted.

Column 11,
Line 58, "data-of" should read -- data of --.

Column 12,
Line 67, "the-intersection" should read -- the intersection --.

Column 14,
Line 57, "tank-in" should read -- ink in --.

UNITED STATES PATENT AND TRADEMARK OFFICE
CERTIFICATE OF CORRECTION

PATENT NO. : 6,601,938 B1
DATED : August 5, 2003
INVENTOR(S) : Iwasaki et al.

It is certified that error appears in the above-identified patent and that said Letters Patent is hereby corrected as shown below:

Column 16,
Line 57, "the-type" should read -- the type --.

Signed and Sealed this

Thirteenth Day of April, 2004

JON W. DUDAS
*Acting Director of the United States Patent and Trademark Office*